United States Patent
Rovatsos et al.

(10) Patent No.: US 12,475,487 B2
(45) Date of Patent: Nov. 18, 2025

(54) SYSTEM AND METHOD FOR AUTOMATICALLY COMPUTING AND UPDATING ADVERTISEMENT BIDDINGS FOR COLD ITEMS

(71) Applicant: Walmart Apollo, LLC, Bentonville, AR (US)

(72) Inventors: Georgios Rovatsos, San Francisco, CA (US); Saeed Ahmadian, Seattle, WA (US); Ahinoam Pollack, Menlo Park, CA (US); Sandip Bhattacharjee, Bangalore (IN); Anurag Das, Bangalore (IN); Aman Avilash, Bangalore (IN); Changzheng Liu, Sunnyvale, CA (US); Wei Shen, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/637,648

(22) Filed: Apr. 17, 2024

(65) Prior Publication Data
US 2024/0354810 A1 Oct. 24, 2024

Related U.S. Application Data

(60) Provisional application No. 63/496,807, filed on Apr. 18, 2023.

(51) Int. Cl.
G06Q 30/02 (2023.01)
G06Q 30/0273 (2023.01)

(52) U.S. Cl.
CPC ............... *G06Q 30/0275* (2013.01)

(58) Field of Classification Search
CPC .................. G06Q 30/0207–30/0277
See application file for complete search history.

(56) References Cited

U.S. PATENT DOCUMENTS 8,650,066 B2 * 2/2014 Shah ................ G06Q 30/0244
705/14.42
9,953,055 B1 * 4/2018 Engebretsen ......... G06F 16/26
(Continued)

OTHER PUBLICATIONS

F. Pan et al., "Warm Up Cold-start Advertisements: Improving CTR Predictions via Learning to Learn ID Embeddings," Apr. 25, 2019, 10 pages.
(Continued)

*Primary Examiner* — Thuy N Nguyen
(74) *Attorney, Agent, or Firm* — Jones Day

(57) ABSTRACT

Systems and methods for automatically computing biddings for cold items are disclosed. A first bid value is computed and submitted for a first bidding for a first set of items each having a predicted sales metric larger than a first threshold in a first time period. From the first set of items, a second set of items are selected that have a traffic metric smaller than a second threshold in a second time period. Each item in the second set is assigned to one of a plurality of clusters. A second bid value is computed for each cluster based on cluster-level metrics and a click distribution among the plurality of clusters. An updated bid value is computed, for each item in the second set, to be submitted for a second bidding, based on the second bid value for a cluster to which the item is assigned.

20 Claims, 16 Drawing Sheets

(56) References Cited

U.S. PATENT DOCUMENTS

| | | | | |
|---|---|---|---|---|
| 9,996,851 | B1* | 6/2018 | Hummel | G06Q 30/0242 |
| 10,242,388 | B2* | 3/2019 | Shen | G06Q 30/0277 |
| 10,282,758 | B1* | 5/2019 | Els | G06Q 30/0269 |
| 11,941,073 | B2* | 3/2024 | Bennett | G06F 16/906 |
| 2006/0293995 | A1* | 12/2006 | Borgs | G06Q 30/0283 |
| | | | | 705/37 |
| 2007/0033105 | A1* | 2/2007 | Collins | G06Q 30/0257 |
| | | | | 705/14.66 |
| 2012/0173326 | A1* | 7/2012 | Tao | G06Q 30/0244 |
| | | | | 705/14.43 |
| 2012/0290386 | A1* | 11/2012 | Skinner | G06Q 30/0247 |
| | | | | 705/14.46 |
| 2014/0164383 | A1* | 6/2014 | Tang | G06Q 30/02 |
| | | | | 707/737 |
| 2015/0066661 | A1* | 3/2015 | Bhattacharjee | G06Q 30/08 |
| | | | | 705/14.71 |
| 2015/0134463 | A1* | 5/2015 | Jalali | G06Q 30/0275 |
| | | | | 705/14.71 |
| 2015/0278687 | A1* | 10/2015 | Sculley, II | G06Q 30/0255 |
| | | | | 706/47 |
| 2017/0193561 | A1* | 7/2017 | Shen | G06Q 30/0275 |
| 2017/0262899 | A1* | 9/2017 | Geraghty | G06Q 30/0277 |
| 2017/0330219 | A1* | 11/2017 | Feldman | G06Q 30/0243 |
| 2019/0026786 | A1* | 1/2019 | Khoury | G06Q 30/0271 |
| 2020/0098014 | A1* | 3/2020 | Hassan | G06Q 30/08 |

OTHER PUBLICATIONS

C. Jie et al., "Multi-objective cluster based bidding algorithm for E-commerce search engine marketing system," Frontiers in Big Data, Sep. 26, 2022, 31 pages.

D. Bergemann et al., "Calibrated Click-Through Auctions: An Information Design Approach," May 21, 2021, 38 pages.

ClearCode, "Tracking and Reporting Impressions, Clicks, and Conversions in AdTech Platforms," Downloaded: Apr. 17, 2025, 31 pages.

* cited by examiner

SYSTEM AND METHOD FOR AUTOMATICALLY COMPUTING AND UPDATING ADVERTISEMENT BIDDINGS FOR COLD ITEMS

CROSS-REFERENCE TO RELATED APPLICATIONS

This application claims benefit under 35 U.S.C. 119(e) to U.S. Provisional Application No. 63/496,807, filed 18 Apr. 2023, entitled "SYSTEM AND METHOD FOR AUTOMATICALLY COMPUTING AND UPDATING ADVERTISEMENT BIDDINGS FOR COLD ITEMS," the disclosure of which is incorporated by reference herein in its entirety.

TECHNICAL FIELD

This application relates generally to advertising campaigns and, more particularly, to systems and methods for automatically computing and updating advertisement biddings for cold items in advertising campaigns.

BACKGROUND

Advertisements are commonly used on the Internet to promote various products. Search engine marketing (SEM) involves promoting websites in search engine results, often through paid advertising to search engine companies. Types of advertisements in SEM can include product listing advertisements and keyword (textual) advertisements, for example. SEM has become a significant factor in driving web traffic to various websites.

A sponsor of advertisements, e.g. a retailer, may have millions of paid marketing channel advertisements, including advertisements for SEM. But usually only a small portion of advertisements can attract online traffic to the retailer's website. Existing advertisement technology focuses on these traffic attracting advertisements (called warm advertisements) with historical traffic data, without considering many items that are new or cold in advertising campaigns.

SUMMARY

The embodiments described herein are directed to systems and methods for automatically computing and updating advertisement biddings for cold items in advertising campaigns.

In various embodiments, a system including a non-transitory memory configured to store instructions thereon and at least one processor is disclosed. The at least one processor is configured to read the instructions to: select, from a plurality of items, a first set of items each having a predicted sales metric larger than a first threshold in a first time period; compute, for each item in the first set, a first bid value to be submitted for a first advertisement bidding; select, from the first set of items, a second set of items each having a traffic metric smaller than a second threshold in a second time period; generate a plurality of clusters by assigning each item in the second set to one of the plurality of clusters based on metrics and features of the item; compute a second bid value for each of the plurality of clusters based on cluster-level metrics of each cluster and a click distribution among the plurality of clusters; and compute, for each item in the second set, an updated bid value to be submitted for a second advertisement bidding, based on the second bid value for a cluster to which the item is assigned.

In various embodiments, a system including a non-transitory memory configured to store instructions thereon and at least one processor is disclosed. The at least one processor is configured to read the instructions to: select a first set of items from a plurality of items, wherein each item in the first set has a predicted gross merchandise value (GMV) larger than a first threshold in a first time period; generate a predicted revenue per click (RPC) for each item in the first set; compute a first bid value for each item in the first set based on the predicted RPC; transmit the first bid value for a first advertisement bidding of each item in the first set; select a second set of items from the first set, wherein each item in the second set has a traffic metric smaller than a second threshold in a second time period; generate a plurality of clusters by assigning each item in the second set to one of the plurality of clusters based on metrics and features of the item; compute a cluster-level RPC for each of the plurality of clusters; compute a second bid value for each of the plurality of clusters based on the cluster-level RPC of the cluster and a target return on ad spend (ROAS) of items in the cluster; generate a third bid value for each of the plurality of clusters based on the second bid value and whether clicks are uniformly distributed among the plurality of clusters; determine an updated bid value for each item in the second set based on the third bid value for a cluster to which the item is assigned; and transmit the updated bid value for a second advertisement bidding of each item in the second set.

In various embodiments, a computer-implemented method is disclosed. The computer-implemented method includes: selecting, from a plurality of items, a first set of items each having a predicted sales metric larger than a first threshold in a first time period; computing, for each item in the first set, a first bid value to be submitted for a first advertisement bidding; selecting, from the first set of items, a second set of items each having a traffic metric smaller than a second threshold in a second time period; generating a plurality of clusters by assigning each item in the second set to one of the plurality of clusters based on metrics and features of the item; computing a second bid value for each of the plurality of clusters based on cluster-level metrics of each cluster and a click distribution among the plurality of clusters; and computing, for each item in the second set, an updated bid value to be submitted for a second advertisement bidding, based on the second bid value for a cluster to which the item is assigned.

In various embodiments, a non-transitory computer readable medium having instructions stored thereon is disclosed. The instructions, when executed by at least one processor, cause at least one device to perform operations including: selecting, from a plurality of items, a first set of items each having a predicted sales metric larger than a first threshold in a first time period; computing, for each item in the first set, a first bid value to be submitted for a first advertisement bidding; selecting, from the first set of items, a second set of items each having a traffic metric smaller than a second threshold in a second time period; generating a plurality of clusters by assigning each item in the second set to one of the plurality of clusters based on metrics and features of the item; computing a second bid value for each of the plurality of clusters based on cluster-level metrics of each cluster and a click distribution among the plurality of clusters; and computing, for each item in the second set, an updated bid value to be submitted for a second advertisement bidding, based on the second bid value for a cluster to which the item is assigned.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
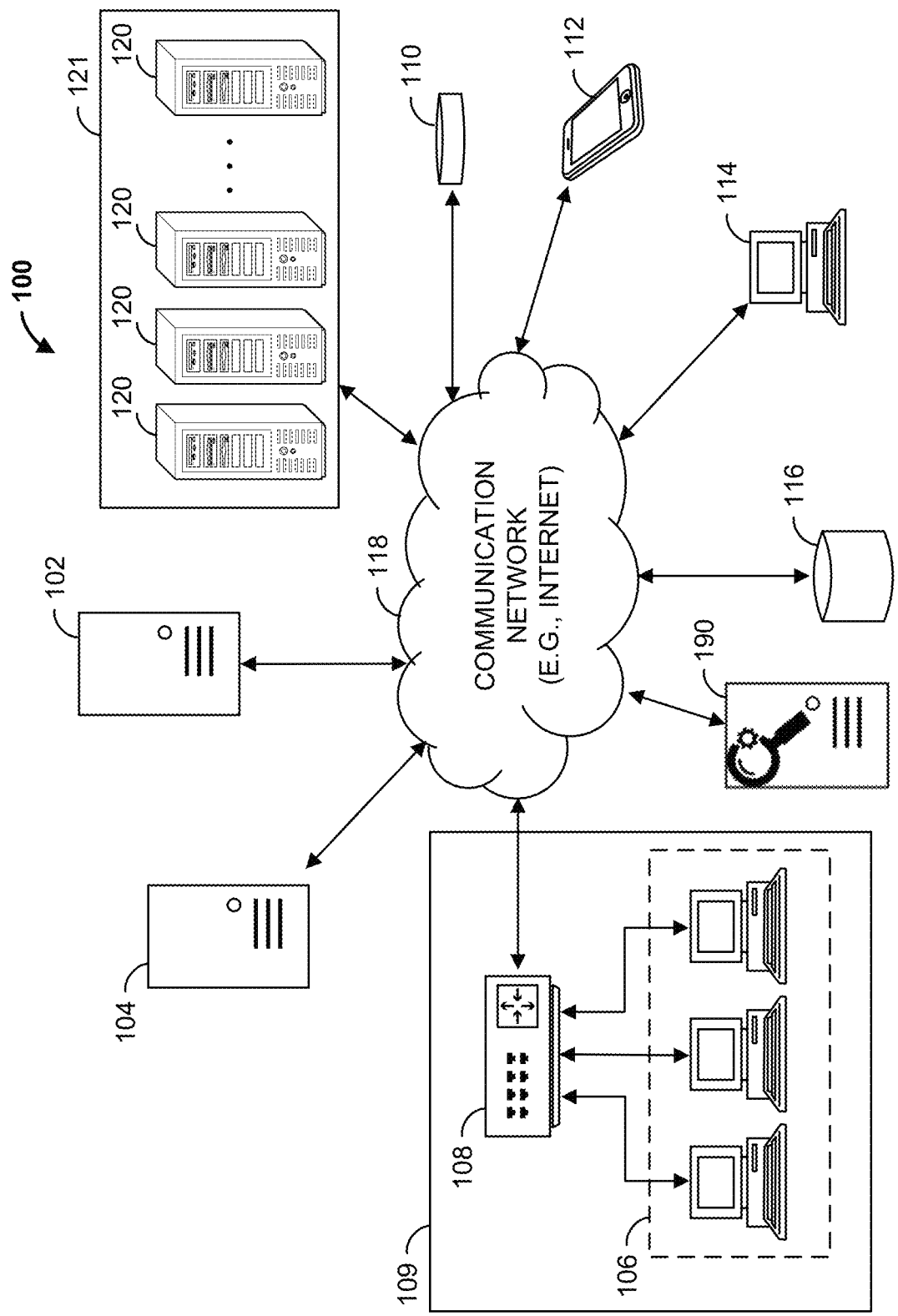
FIG. 1 is a network environment configured to automatically compute and update advertisement biddings, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

A sponsor of an advertisement may advertise an item on a website, such as a website of an online search engine. In at least some examples, the advertisement may be part of an advertising campaign that identifies one or more products to promote on the website. Many items in an advertising campaign are new or cold, without enough historical traffic or sales data for analysis. One goal of various embodiments in the present teaching is to identify high potential items from a pool of cold items, and provide an automated bidding management for advertising these items.

In some embodiments, a disclosed system may utilize a new training data structure for training a cold start machine learning model to predict potential items that could become warm in future. The training structure simulates a manner that each advertisement is warmed up, meaning that each training point is a case of a cold item advertisement (e.g. advertisement with no or little clicks in most recent months) getting clicks. The label of each point may be the corresponding conversion rate. At a classification stage, the trained machine learning model may be used to identify items that will be warmed up. In some embodiments, the machine learning model may be trained based on BERT (Bidirectional Encoder Representations from Transformers) embeddings, such that a bid value is computed at the stage of bid initialization for each identified item, based on their predicted revenue per clicks (RPCs) using item name as an input to the BERT natural language processing model.

In some embodiments, the disclosed system may perform a cluster bidding for cold items in the stage of bid management. For example, cold items (e.g. items having clicks less than a threshold) may be aggregated based on two main factors, including (a) their performance metrics during the advertising campaign, such as ad spend, impression, impression share, gross merchandise value (GMV), clicks and etc.; and (b) their content features such as item names and category hierarchy features. These two sets of features can be used to generate clusters that represent each item. Therefore, instead of item level bidding for these cold items, bids are generated for each cluster based on their revenue per click (RPC) and target return on ad spend (ROAS). To avoid sparsity in each cluster, the system may use a new heuristic method to balance the number of clicks in each cluster and remove possible noise and bias for cluster bidding.

As such, the system may support both bid initialization and bid refresh and management for cold items in advertising campaigns. The disclosed techniques can lead to an increase in the number of attracted traffics for cold advertisements, as well as better ROAS and better warm-up rates.

Furthermore, in the following, various embodiments are described with respect to methods and systems for automatically computing and updating advertisement biddings for cold items in advertising campaigns are disclosed. In some embodiments, a first bid value is computed, for each item in a first set of items, to be submitted for a first advertisement bidding, where each item in the first set has a predicted sales metric larger than a first threshold in a first time period. From the first set of items, a second set of items are selected, where each item in the second set has a traffic metric smaller than a second threshold in a second time period. Each item in the second set is assigned to one of a plurality of clusters based on metrics and features of the item. A second bid value is computed for each of the plurality of clusters based on cluster-level metrics of each cluster and a click distribution among the plurality of clusters. An updated bid value is computed, for each item in the second set, to be submitted for a second advertisement bidding, based on the second bid value for a cluster to which the item is assigned.

Turning to the drawings, FIG. 1 is a network environment 100 configured to automatically compute and update advertisement biddings, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, an advertising campaign computing device 102 (e.g., a server, such as an application server), a web server 104, a search engine server 190, a cloud-based engine 121 including one or more processing devices 120, workstation(s) 106, a database 116, and one or more customer computing devices 110, 112, 114 operatively coupled over the network 118. The advertising campaign computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the advertising campaign computing device 102, the search engine server 190 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the advertising campaign computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more websites providing one or more products or services. In some examples, the advertising campaign computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

In some examples, the search engine server 190 provides an online search engine service to online users, and provides a platform for search engine marketing (SEM) to retailers selling products or services. In some examples, at least one of the multiple customer computing devices 110, 112, 114 is operated by a user of the search engine service.

The workstation(s) 106 are operably coupled to the communication network 118 via a router (or switch) 108. The workstation(s) 106 and/or the router 108 may be located at a store 109, for example. The workstation(s) 106 can communicate with the advertising campaign computing device 102 over the communication network 118. The workstation(s) 106 may send data to, and receive data from, the advertising campaign computing device 102. For example, the workstation(s) 106 may transmit data identifying items purchased by a customer at the store 109 to the advertising campaign computing device 102.

Although FIG. 1 illustrates three customer computing devices 110, 112, 114, the network environment 100 can include any number of customer computing devices 110, 112, 114. Similarly, the network environment 100 can include any number of the advertising campaign computing devices 102, the search engine servers 190, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website hosted by the web server 104. The web server 104 may transmit user session data related to a customer's activity (e.g., interactions) on the website. For example, a customer may operate one of the customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the advertising campaign computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the advertising campaign computing device 102.

In some embodiments, each of the customer computing devices 110-114 may communicate with the search engine server 190 over the communication network 118. For example, each of the multiple computing devices 110, 112, 114 may be operable to submit a query to a search engine hosted by the search engine server 190. The search engine server 190 may provide search results in response to the query on a website of the search engine or via an APP on the customer computing device. The search results may include one or more advertisements of items related to the query.

While the same item can be sold by different retailers, advertisement biddings may be submitted by the different retailers to compete for the impression of the item in the search results. For example, the retailer associated with the web server 104 and the advertising campaign computing device 102 may submit advertisement biddings to the search engine server 190, based on bid values computed by the advertising campaign computing device 102. An advertisement bidding may be transmitted by a retailer to the search engine server 190 in real-time after the query is submitted by the user, or by transmitted to the search engine server 190 periodically to update a bidding agent algorithm stored at the search engine server 190 for the corresponding retailer. After a user clicks on an advertised item in the search results, the user is re-directed to the website of the retailer sponsoring the advertised item. As such, by bidding for advertisements at the SEM platform, each retailer is competing to attract online traffic to its own retailer website, to increase sales on its retailer website.

In some examples, the advertising campaign computing device 102 may execute one or more models (e.g., algorithms), such as a machine learning model, deep learning model, statistical model, etc., to determine recommended items to advertise to the customer (i.e., item recommendations). The advertising campaign computing device 102 may represent a retailer to transmit advertisement bid values to the search engine server 190 over the communication network 118, directly or through the web server 104. The search engine server 190 may receive bid values from different retailers, and perform an advertisement auction process based on the bid values to determine which advertisement(s) can be put into search results for a given query.

The advertising campaign computing device 102 is further operable to communicate with the database 116 over the communication network 118. For example, the advertising campaign computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the advertising campaign computing device 102, in some examples, the database 116 can be a local storage device, such as a hard drive, a non-volatile memory, or a USB stick. The advertising campaign computing device 102 may store purchase data received from the web server 104 in the database 116. The advertising campaign computing device 102 may also receive from the web server 104 user session data identifying events associated with browsing sessions, and may store the user session data in the database 116.

In some examples, the advertising campaign computing device 102 generates training data for a plurality of models (e.g., machine learning models, deep learning models, statistical models, algorithms, etc.) based on: e.g. historical customer session data, search data, purchase data, catalog data, search engine marketing data, advertisement data, cluster data, traffic data, item features, etc. The advertising campaign computing device 102 trains the models based on their corresponding training data, and the advertising campaign computing device 102 stores the models in a database, such as in the database 116 (e.g., a cloud storage).

The models, when executed by the advertising campaign computing device 102, allow the advertising campaign computing device 102 to identify potential warm-up items, predict RPC for an item, clustering items, and/or compute bid values for items, based on corresponding datasets. For example, the advertising campaign computing device 102 may obtain the models from the database 116. The advertising campaign computing device 102 may receive in real-time from the search engine server 190, a bid request identifying a request for bid values to advertise items related to a given query on the SEM platform hosted by the search engine server 190. In response to receiving the request, the advertising campaign computing device 102 may execute the models to compute bid values for advertising the items on the SEM platform.

In some examples, the advertising campaign computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the advertising campaign computing device 102 may automatically compute and update bid values for advertising different items including cold items, e.g. at an SEM platform hosted by the search engine server 190.

Figure 2:
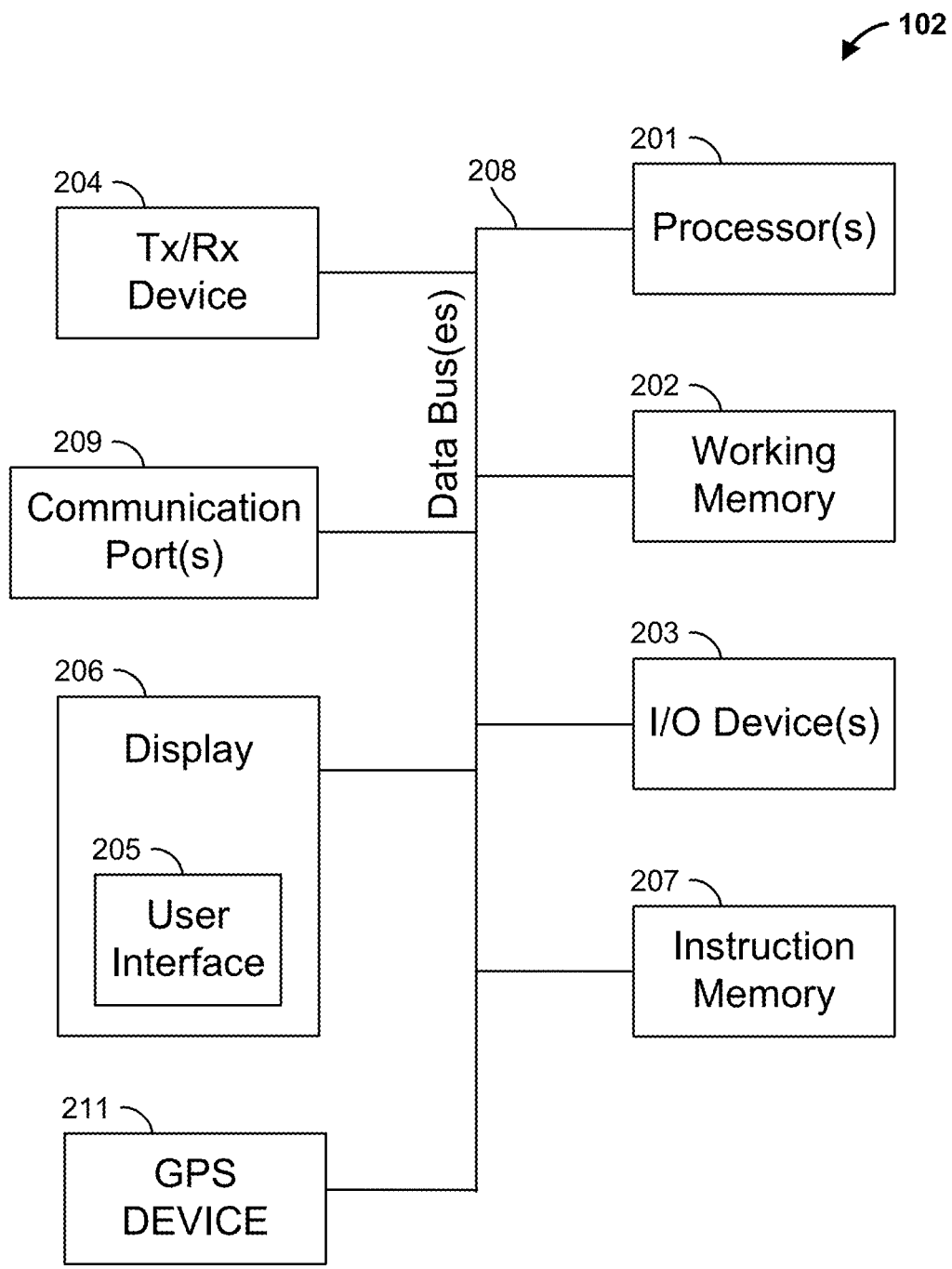
FIG. 2 is a block diagram of an advertising campaign computing device, in accordance with some embodiments.

FIG. 2 illustrates a block diagram of an advertising campaign computing device, e.g. the advertising campaign computing device 102 of FIG. 1, in accordance with some embodiments of the present teaching. In some embodiments, each of the advertising campaign computing device 102, the web server 104, the search engine server 190, the workstation(s) 106, the multiple customer computing devices 110, 112, 114, and the one or more processing devices 120 in FIG. 1 may include the features shown in FIG. 2. Although FIG. 2 is described with respect to the advertising campaign computing device 102. It should be appreciated, however, that the elements described can be included, as applicable, in any of the advertising campaign computing device 102, the web server 104, the search engine server 190, the workstation(s) 106, the multiple customer computing devices 110, 112, 114, and the one or more processing devices 120.

As shown in FIG. 2, the advertising campaign computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the advertising campaign computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the advertising campaign computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the advertising campaign computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the advertising campaign computing device 102 may determine a local geographical area (e.g., town, city, state, etc.) of its position. Based on the geographical area, the advertising campaign computing device 102 may determine relevant trend data (e.g., trend data identifying events in the geographical area).

Figure 3:
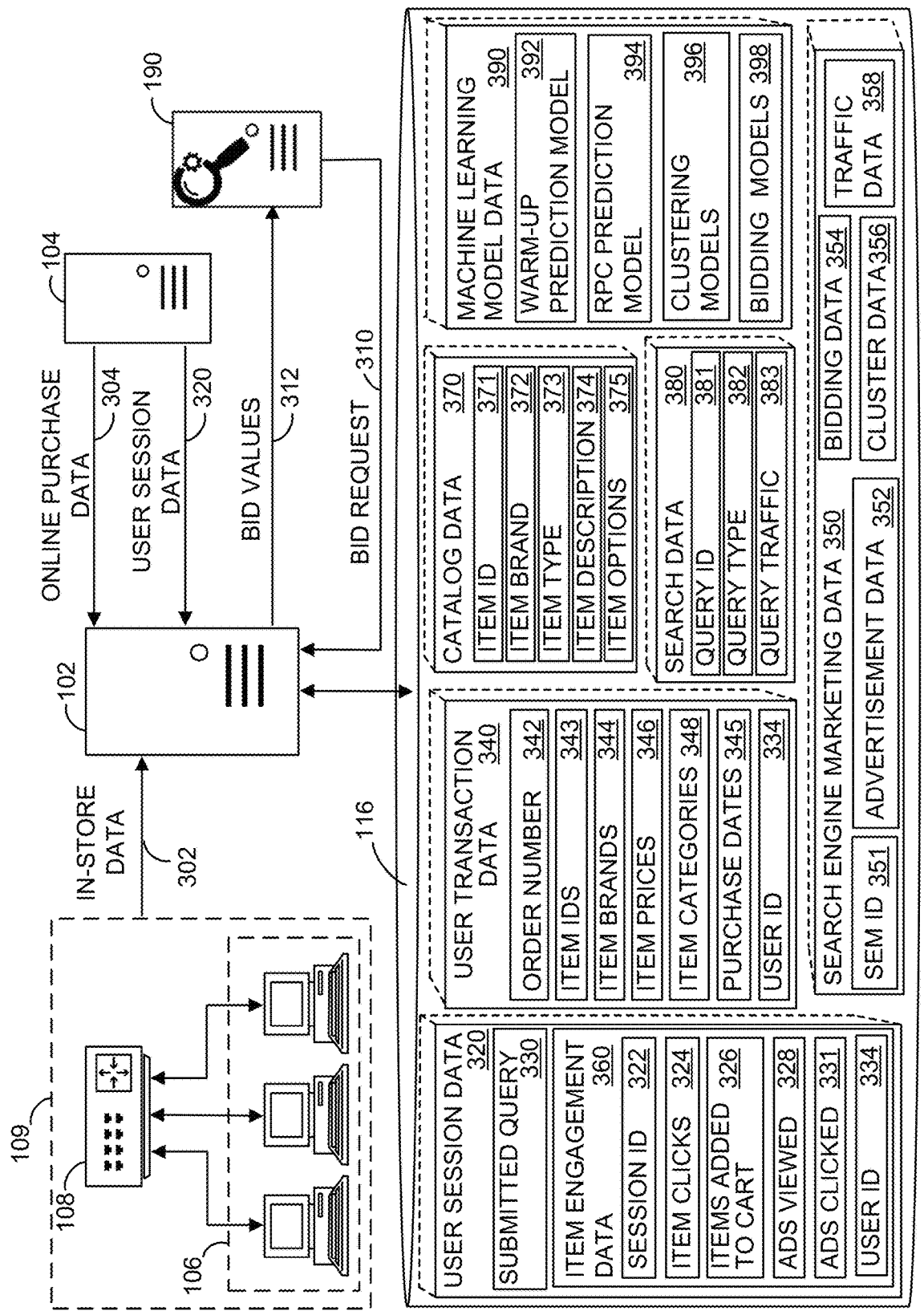
FIG. 3 is a block diagram illustrating various portions of an advertising campaign management system, in accordance with some embodiments.

FIG. 3 is a block diagram illustrating various portions of an advertising campaign management system, e.g. the advertising campaign management system shown in the network environment 100 of FIG. 1, in accordance with some embodiments of the present teaching. As indicated in FIG. 3, the advertising campaign computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 360 and/or submitted query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.). The submitted query data 330 may identify one or more searches conducted by a user during a browsing session (e.g., a current browsing session).

The advertising campaign computing device 102 may also receive online purchase data 304 from the web server 104, which identifies and characterizes one or more online purchases, such as purchases made by the user and other users via a retailer's website hosted by the web server 104. The advertising campaign computing device 102 may also receive in-store data 302 from the store 109, which identifies and characterizes one or more in-store purchases, in-store advertisements, in-store shopping data, etc. In some embodiments, the in-store data 302 may also indicate availability of items in the store 109, and/or user IDs that have selected the store 109 as a default store for picking up online orders.

The advertising campaign computing device 102 may parse the in-store data 302 and the online purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., a product type like grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store search data 380, which may identify one or more attributes of a plurality of queries submitted by users on the website hosted by the web server 104 and/or on a website of a search engine hosted by the search engine server 190. The search data 380 may include, for each of the plurality of queries, a query ID 381 identifying a query previously submitted by users, a query type 382 (e.g., a head query, a torso query, or a tail query), and query traffic data 383 identifying how many times the query has been submitted or how many clicks the query has received.

In some examples, the advertising campaign computing device 102 can interact with the search engine server 190, to participate an advertisement auction process at the SEM platform hosted by the search engine server 190. During the advertisement auction process, different businesses, including the retailer associated with the advertising campaign computing device 102, can submit bids for advertising their respective items in search results to be displayed to a user of the search engine server 190. In some embodiments, each advertisement auction process may be regarding a given query submitted by a user, a given item matching a query, and/or a given spot in the search result webpage. The advertising campaign computing device 102 may obtain various data related to the SEM platform from the search engine server 190.

The database 116 may store search engine marketing data 350, which may identify marketing data based on paid advertisements in search results at commercial search engines, where the paid advertisements are to promote items offered by the retailer website in the search results. For example, the search engine marketing data 350 search engine marketing data 350 may include information related to various SEM platforms, including the SEM platform hosted by the search engine server 190. In the example in FIG. 3, the search engine marketing data 350 includes: an SEM ID 351 identifying one or more SEMs the advertising campaign computing device 102 has submitted bids or will submit bids to; advertisement data 352 for each SEM, bidding data 354 for each SEM, cluster data 356, and traffic data 358.

The advertisement data 352 may include: campaign data identifying data of an advertising campaign for each advertisement put by the retailer of the advertising campaign computing device 102 into search results at the search engine server 190, sponsored item(s) associated with the advertisement, an advertisement ID identifying the advertisement, and/or ad tag data identifying ad tags associated with the advertisement. The bidding data 354 may include: auction data identifying auction information for the advertisement (e.g. default bidding value, initial bidding value, updated bidding value, a bidding scheme for the advertisement, historical auction results for the advertisement, etc.). The cluster data 356 may include data related to different clusters formed by different items, e.g. cold items, advertised at the SEM platforms. The traffic data 358 may include traffic data, e.g. click data, of different items advertised at the SEM platforms.

The database 116 may also store machine learning model data 390 identifying and characterizing one or more machine learning models and related data for computing and updating bid values for advertising items. For example, the machine learning model data 390 may include a warm-up prediction model 392, an RPC prediction model 394, clustering models 396, and bidding models 398.

In some embodiments, the warm-up prediction model 392 may be used to predict whether an item will become warm in a future time period. The warm-up prediction model 392 may be trained based on context features including item names and item hierarchy features, as well as historical transactional features, auxiliary features, etc. After the warm-up prediction model 392 is trained, it can be applied to item name and item hierarchy features of a cold item (with no or little traffic or transactional data), to predict whether this cold item will be warmed up in a future time period, e.g. within next month.

The RPC prediction model 394 may be used to predict an RPC of an item. In some embodiments, the RPC prediction model 394 is used to predict an RPC for an item identified to be warmed up in the future time period by the warm-up prediction model 392. In some embodiments, the RPC prediction model 394 and the warm-up prediction model 392 can be trained together using historical RPC of advertisements as labels.

The clustering models 396 may be used to generate clusters for different items, and assign each item to one of the clusters. In some embodiments, the clustering models 396 may be used to cluster only cold items, whose traffic data and/or sales data is below a certain threshold. In some embodiments, the clustering models 396 may include an asymmetric clustering model used to generate asymmetric clusters, where clicks are non-uniformly distributed in the asymmetric clusters. That is, different asymmetric clusters include items whose total numbers of clicks could vary from very low to very high. In some embodiments, the clustering models 396 may also include a symmetric clustering model used to generate symmetric clusters, where clicks are uniformly distributed in the symmetric clusters. That is, different symmetric clusters include items whose total numbers of clicks are the same, or the variance of clicks among the symmetric clusters is below a threshold.

The bidding models 398 may be used to determine a bid value for an advertising an item. In some embodiments, the bidding models 398 may include a warm item bidding model used to compute a bid value for a warm item, whose traffic data and/or sales data is above a certain threshold. The warm item bidding model may be applied to historical sales and traffic data (especially data at the same SEM as the bidding) of the warm item to compute its advertisement bid value. In some embodiments, the bidding models 398 may include a cold item bidding model used to compute a bid value for a cold item, whose traffic data and/or sales data is below the certain threshold. The cold item bidding model may be applied to item context features like item names, item category hierarchy data, item brand, item description, etc. of the cold item, to compute its advertisement bid value.

In some embodiments, one of the bidding models 398 may be used to compute an initial bid value for a cold item, based on the predicted RPC for the cold item computed by the RPC prediction model 394. In some embodiments, one of the bidding models 398 may be used to compute an updated bid value for a cold item, based on the initial bid value of the cold item, content and context features of the cold item, and performance metric data of a cluster to which the cold item is assigned.

In some examples, the advertising campaign computing device 102 receives (e.g., in real-time) a bid request 310 from the search engine server 190. In response, the advertising campaign computing device 102 generates one or more bid values 312 identifying bids for advertising one or more items in search results to be displayed by the search engine server 190. In some examples, the bid request 310 may be associated with a query submitted by a user of a search engine hosted by the search engine server 190. In response, the advertising campaign computing device 102 generates the bid values 312 for items that can match the query. In some embodiments, the advertising campaign computing device 102 may transmit the bid values 312 to the search engine server 190 in response to the bid request 310. In some embodiments, the advertising campaign computing device 102 may transmit the bid values 312 to the search engine server 190 periodically or upon an event, to update previously submitted bids to the search engine server 190 regarding same items, e.g. some cold items. For example, a bid value for advertising a cold item at an SEM may be updated every day, every week, every month, upon a holiday season, upon a shopping season, or upon a release of a newer version of the item, etc.

In some embodiments, the advertising campaign computing device 102 may assign one or more of the operations described above to a different processing unit or virtual machine hosted by the one or more processing devices 120. Further, the advertising campaign computing device 102 may obtain the outputs of the these assigned operations from the processing units, and compute and/or update bid values 312 based on the outputs.

Figure 4:
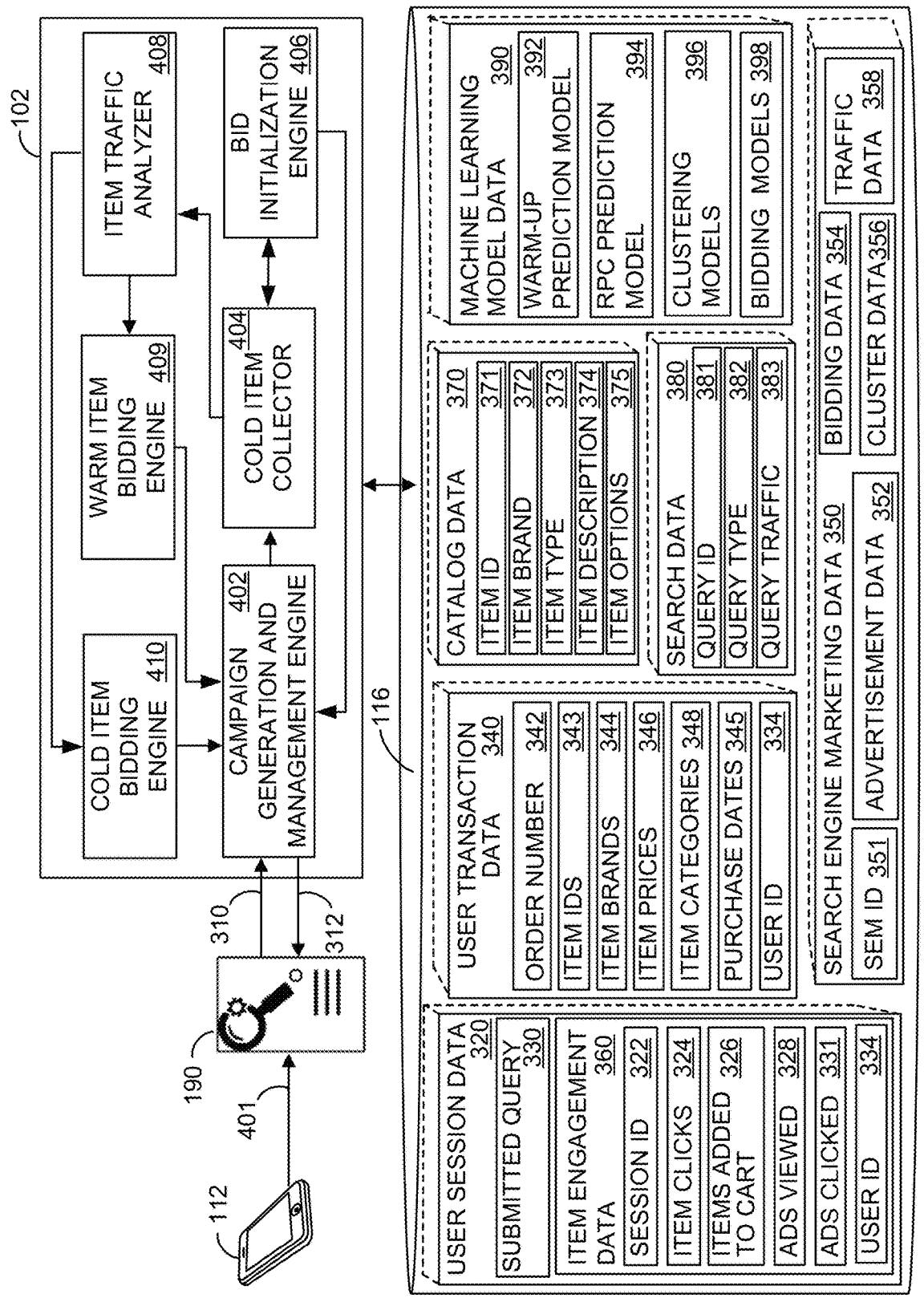
FIG. 4 is a block diagram illustrating various portions of an advertising campaign computing device, in accordance with some embodiments.

FIG. 4 is a block diagram illustrating various portions of an advertising campaign computing device, e.g. the advertising campaign computing device 102 in FIG. 1, in accordance with some embodiments of the present teaching. As shown in FIG. 4, the advertising campaign computing device 102 includes a campaign generation and management engine 402, a cold item collector 404, a bid initialization engine 406, an item traffic analyzer 408, a warm item bidding engine 409, and a cold item bidding engine 410. In some examples, one or more of the campaign generation and management engine 402, the cold item collector 404, the bid initialization engine 406, the item traffic analyzer 408, the warm item bidding engine 409, and the cold item bidding engine 410 are implemented in hardware. In some examples, one or more of the campaign generation and management engine 402, the cold item collector 404, the bid initialization engine 406, the item traffic analyzer 408, the warm item bidding engine 409, and the cold item bidding engine 410 are implemented as an executable program maintained in a tangible, non-transitory memory, such as instruction memory 207 of FIG. 2, which may be executed by one or processors, such as the processor 201 of FIG. 2.

For example, the campaign generation and management engine 402 may obtain from the search engine server 190 a bid request 310 as a query 401 is sent from the user device 112 to the search engine server 190, and may compute and transmit one or more bid values 312 to the search engine server 190, to bid for advertising one or more items, offered by the website hosted by the web server 104, in search results to be displayed by the search engine server 190. The message 401 sent by the user using the user device 112 may indicate a query to search for items related to the query. While different retailers may sell various items matching the same query, the retailers can compete to put their own advertisements into the limited space in the search results generated in response to the query. In some embodiments, when multiple advertisements are displayed in a same search result page, the multiple advertisements are ranked based on the bid values submitted by different retailers. For example, a first advertisement having a higher bid value may be placed before a second advertisement having a lower bid value, given similar relevancy scores of the two advertisements, such that the user is likely to see the first advertisement before the second advertisement.

In this example, the campaign generation and management engine 402 receives the bid request 310, and determines a query and/or items to bid for. In some embodiments, the campaign generation and management engine 402 may first create an advertising campaign if there is no advertising campaign created for the query and/or items. For example, the campaign generation and management engine 402 may obtain advertisement related data and item related data associated with the query and/or items, e.g. by parsing the user session data 320, the user transaction data 340, the catalog data 370, the search data 380, and/or the search engine marketing data 350 in the database 116. The campaign generation and management engine 402 may generate and/or update an advertising campaign based on the obtained data. The campaign generation and management engine 402 may send campaign related data to the cold item collector 404.

In some embodiments, the cold item collector 404 can obtain or collect various data related to cold items. While the advertising campaign computing device 102 can also be used to compute bids for warm items in some embodiments, the following disclosure will focus on computing bids for cold items. In some embodiments, the cold item collector 404 can identify a cold item based on its launching time, historical data, and some thresholds. For example, an item that is newly launched (e.g. within last several days, or last one or two weeks) on the retailer's website may be counted as a cold item. In some examples, an item whose sales number per day within past week or past month less than a threshold may be counted as a cold item. In some examples, an item whose revenue or GMV per day within past week or past month less than a threshold may be counted as a cold item. In some examples, an item whose traffic or clicks per day within past week or past month less than a threshold may be counted as a cold item.

In some embodiments, the cold item collector 404 may send the data related to cold items to the bid initialization engine 406 for generating an initial bid for each cold item. The data may include features to be used for training a machine learning model at the bid initialization engine 406, and/or generating an initial bid for cold items based on a trained machine learning model.

In some embodiments, for cold advertisement bid initialization, the bid initialization engine 406 may rely on a Bidirectional Encoder Representations from Transformers (BERT) natural language processing model to predict advertisement revenue per click for an item using item name as an input. In some embodiments, the model uses a novel training data structure which is constructed by emulating the process of advertisements transitioning from a cold state to a warm state. Items that are chosen for model training may be selected by a classifier that predicts whether an advertisement is going to attract online traffic. The classifier uses multiple transactional and auxiliary features from recent months, such as GMV contribution, volume contribution, price and seasonality of categories etc., as well as item context feature using title BERT embeddings. Advertisement selection for training leads to a more balanced training mechanism that prioritizes the cold-to-warm item transition.

In some embodiments, the bid initialization engine 406 may identify cold items that will become warm (referred to as to-be-warmed items) in a future time period, and inform the cold item collector 404 about the identified to-be-warmed items. In some embodiments, for each of the to-be-warmed items, the bid initialization engine 406 may generate an initial bid value and send the initial bid value to the campaign generation and management engine 402, which can submit the initial bid values for the to-be-warmed items to the search engine server 190. Then, the advertising campaign computing device 102 will manage the advertising campaign to automatically update the bid values for these to-be-warmed items.

In some embodiments, the cold item collector 404 can collect data about the to-be-warmed items, e.g. from the database 116, and send the collected data to the item traffic analyzer 408. The item traffic analyzer 408 may analyze traffic data of each to-be-warmed item within a past time period, and determine whether the traffic data is above a threshold or not. For example, the item traffic analyzer 408 may determine whether the number of clicks of a to-be-warmed item exceeds a threshold since last update or initialization of bidding for this item. If so, the to-be-warmed item has really been warmed up to become a warm item, and the item traffic analyzer 408 may send data of the warm item to the warm item bidding engine 409 for a warm item bidding update. Otherwise, if the number of clicks of the to-be-warmed item does not exceed the threshold, the to-be-warmed item is still a cold item, and the item traffic analyzer 408 may send data of the cold item to the cold item bidding engine 410 for a cold item bidding update.

The warm item bidding engine 409 in this example may obtain data of a warm item from the item traffic analyzer 408, and/or from the database 116. The warm item bidding engine 409 may compute an updated bid value for the warm item based on these data, periodically, upon a request or upon an event. For example, based on historical sales data, traffic data, etc. of the warm item, the warm item bidding engine 409 may compute a historical RPC for the warm item during a past time period, and compute a predicted RPC based on the historical RPC. The warm item bidding engine 409 may then compute the updated bid value for the warm item based on the predicted RPC, and send the updated bid value to the campaign generation and management engine 402, which can submit the updated bid values for the warm items to the search engine server 190, in a data format (e.g., message) acceptable by the search engine server 190.

The cold item bidding engine 410 in this example may obtain data of a cold item from the item traffic analyzer 408, and/or from the database 116. The cold item bidding engine 410 may manage bidding for the cold item and compute an updated bid value for the cold item based on these data, periodically, upon a request or upon an event. Since cold items and advertisements receive a very small portion of traffic during advertising campaigns, it is very hard to generate accurate RPC predictions. In most scenarios, cold items will only receive few clicks and no orders. As such, the cold item bidding engine 410 may categorize cold advertisements (or say cold items) into clusters using two sets of features. The first set of features includes: advertisement behavior in terms of number of clicks, impressions, impression share, ad-spend and other campaign performance metrics. The second set of features include: item content-based similarities such as item price and hierarchy information. By combining the two sets of features, the cold item bidding engine 410 can train a cluster-based machine learning model to obtain RPC predictions for each cluster of advertisements, and compute bids based on these RPC predictions. In addition, since there are situations in which the number of clicks in each cluster can be different, a heuristic balancing algorithm and an advanced K-Means algorithm with customized constraints may be used to avoid local solutions with sparse traffic in some clusters, and therefore reduce the noise in predicted RPC. As such, the cold item bidding engine 410 may first generate symmetric clusters, by assigning each item to one of the symmetric clusters based on metrics and features of the item, such that the clicks are about uniformly distributed among the symmetric clusters. Then, the cold item bidding engine 410 can perform a symmetric bidding to compute a cluster-level bid value for each cluster based on cluster-level metrics of each cluster. Then for each cold item identified by the item traffic analyzer 408, the cold item bidding engine 410 may compute an updated bid value based on the cluster-level bid value for a cluster to which the cold item is assigned. The cold item bidding engine 410 may send the updated bid value to the campaign generation and management engine 402, which can submit the updated bid values for the cold items to the search engine server 190, in a data format (e.g., message) acceptable by the search engine server 190.

Figure 5:
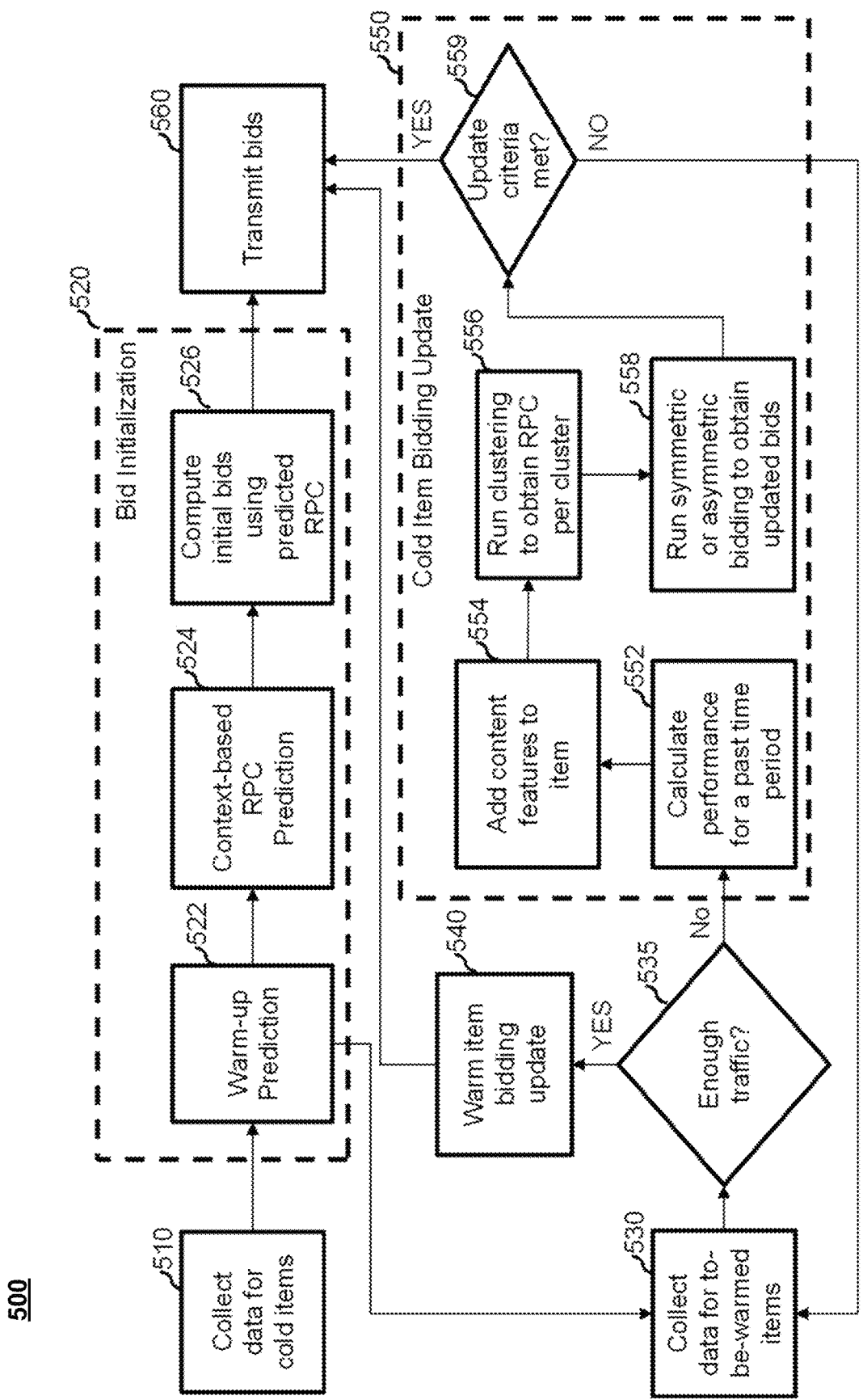
FIG. 5 illustrates a process for automatically computing and updating advertisement biddings, in accordance with some embodiments.

FIG. 5 illustrates a process 500 for automatically computing and updating advertisement biddings, in accordance with some embodiments of the present teaching. In some embodiments, the process 500 may be carried out by one or more computing devices, such as the advertising campaign computing device 102 and/or the cloud-based engine 121 of FIG. 1. As shown in FIG. 5, the process 500 starts from operation 510, where data is obtained or collected for cold items. In some embodiment, the operation 510 may be performed by the cold item collector 404 in the advertising campaign computing device 102.

For example, the cold item collector 404 may obtain content features of each cold item and send the content features for bid initialization at operations 520. In some embodiment, the operations 520 may be performed by the bid initialization engine 406 in the advertising campaign computing device 102. As shown in FIG. 5, the operations 520 include three operations 522, 524, 526. At operation 522, the bid initialization engine 406 may predict whether a cold item identified at the operation 510 will likely become warm in a future time period, e.g. based on the data collected at the operation 510. A cold item can be called a to-be-warmed item if the cold item is predicted to become warm in the future time period. In some examples, a cold item is predicted to become warm when the cold item has a predicted gross merchandise value (GMV) larger than a GMV threshold in the future time period. In some examples, a cold item is predicted to become warm when the cold item has a probability to achieve a GMV threshold in the future time period, and the probability is higher than a certain threshold.

At operation 524, the bid initialization engine 406 may predict an RPC for each to-be-warmed item, e.g. based on context information of the item. Then at operation 526, the bid initialization engine 406 may calculate an initial bid for each to-be-warmed item, e.g. based on the RPC predicted at the operation 524 for the item. More details regarding these bid initialization operations will be discussed referring to FIGS. 6-12. At operation 560, the initial bid values for the to-be-warmed items can be transmitted to an SEM platform, to participate advertisement auctions at the SEM platform.

At operation 530, data is obtained or collected for to-be-warmed items identified at the operation 522. In some embodiment, the operation 530 may be performed by the cold item collector 404 in the advertising campaign computing device 102, after the bid initialization operations 520. That is, after an initial bid is computed and submitted for each to-be-warmed item, the advertising campaign computing device 102 can monitor data to determine whether to submit an updated bid for the item.

At operation 535, it is determined whether there is enough traffic for each to-be-warmed item since last submission of bid for this item. In some embodiment, the operation 535 may be performed by the item traffic analyzer 408 in the advertising campaign computing device 102. When the item traffic analyzer 408 determines that a to-be-warmed item has enough traffic since last submission of bid, e.g. having clicks more than a threshold, the item traffic analyzer 408 can send data of the to-be-warmed item for warm item bidding update at operation 540. When the item traffic analyzer 408 determines that a to-be-warmed item does not have enough traffic since last submission of bid, e.g. having clicks less than a threshold, the item traffic analyzer 408 can send data of the to-be-warmed item for cold item bidding update at operations 550.

In some embodiment, the operation 540 may be performed by the warm item bidding engine 409 in the advertising campaign computing device 102. For example, for each warm item passing the traffic threshold at the operation 535, the warm item bidding engine 409 can compute an updated bid value based on historical traffic data, historical sales data, historical RPC data, etc., and send the updated bid value for transmission at the operation 560 to the SEM platform. In some embodiments, the updated bid value for a warm item can be computed based on a linear prediction from the historical traffic and sales data.

In some embodiment, the operations 550 may be performed by the cold item bidding engine 410 in the advertising campaign computing device 102. One purpose of the operations 550 is to use the power of the aggregation, as each cold item has little click or traffic data. Similar cold items with same campaign metrics such as clicks, GMV, ad-spend, and similar item features such as name, category, department, etc. are prone to generate similar RPC. As shown in FIG. 5, the operations 550 include operations 552~559. At operation 552, the cold item bidding engine 410 may calculate a performance metric for each cold item, which does not pass the traffic threshold at operation 535, for a past time period, e.g. for the last 60 days. At operation 554, content features are added to each cold item's dataset. For example, the content features may include: text embedding that may be generated based on item name and/or item descriptions of the cold item, and category hierarchy features for the cold item. In some embodiments, the category hierarchy features for the cold item may identify information of category, department, super-department, division, etc. to which the cold item belongs at the retailer. For example, the category hierarchy features for a Samsung phone may identify a 5G wireless category, a cell phone department, an electronics division, etc.

Based on these content features, a clustering may be performed at operation 556, e.g. by assigning each cold item into one of a plurality of clusters. For example, after aggregating 10,000 items into 10 clusters, the system can obtain some values that are trustable as they are not sparse any more. The cluster-level parameters, e.g. total number of clicks, total GMV, etc. can be more reliable than the item-level parameters, when being used for computing bids. Then an RPC is computed for each cluster.

At operation 558, an updated bid value is computed for each cold item based on either a symmetric bidding or an asymmetric bidding. Without control or constraint, the clustering performed at the operation 556 will result in asymmetric clusters, where clicks are non-uniformly distributed among the asymmetric clusters. That is, some asymmetric clusters may include many clicks, while other asymmetric clusters may include very few clicks. This could defeat the purpose of cluster-based bidding, which tries to aggregate click data of multiple cold items together into clusters to avoid the data sparsity issue of each individual cold item. As such, further processing may be performed at the operation 558 to re-cluster the cold items into symmetric clusters, where clicks are uniformly distributed among the symmetric clusters. Since it is time-consuming to generate symmetric clusters and the system may need the asymmetric bidding as a benchmark to evaluate symmetric bidding, in some situations or for some items, asymmetric bidding is performed by the cold item bidding engine 410 without generating the symmetric clusters.

For each cold item, the cold item bidding engine 410 may generate an updated bid value at operation 558 for the item, e.g. based on RPC of a cluster (either asymmetric or symmetric) to which the item belongs. At operation 559, it is determined whether an updated criteria is met for a cold item. For example, the update criteria may include one or more of: whether a minimum number of days (e.g. 7 days) has passed since last bid update or initialization for the cold item, whether a reliability limit is reached, whether there is a request for a bid update of the cold item, whether there is a current shopping season or holiday season related to the cold item, whether there is a newer version of the cold item, etc. If the update criteria are met at the operation 559, the updated bid value for the cold item can be transmitted to the SEM platform at the operation 560. If the update criteria are not met at the operation 559, the process may go back to the operation 530 to collect more data for the cold item. More details regarding these cold item bidding update operations will be discussed referring to FIGS. 13-15.

In some embodiments, the bid initialization branch including operations 510, 520 and 560, is performed every month, or every two months; while the bid update branch including operations 530, 535, 540, 550 and 560, is performed every day or every one or two weeks. For each item, the bid update branch can be performed any time after the bid initialization branch, e.g. starting from next day.

A retailer may offer millions of items, and it is not practical to improve performance of all of them at the same time. To be effective and efficient in advertising budget allocation, the system can select the items having a high potential to convert to revenue and have a more focused advertisement bidding on them. Among millions of cold items of a retailer, it is natural to focus on cold items having a potential to become warm in a coming time period, e.g. the coming month.

It is possible for items to switch their states between "warm" and "cold" during a year. An item can turn warm from being cold due to various factors, e.g. some improvement in the production quality, improvement in internal search, the item is seasonal and its related shopping season comes, a price change, an improvement in SEM or SEO, availability of complimentary products, etc. In some embodiments, a machine learning model (e.g. a classification model) is disclosed to predict whether an item has a propensity to become warm from its current state of being cold, in the coming time frame. In some embodiments, to define "warm" and "cold," the system utilizes a multi-dimensional method, based on both past GMV performance and price tiering, to remove the bias of shorter purchase cycles of low priced products compared to longer purchase cycles of high priced products. The status of being warm or cold can be derived dynamically using certain thresholds.

Figure 6:
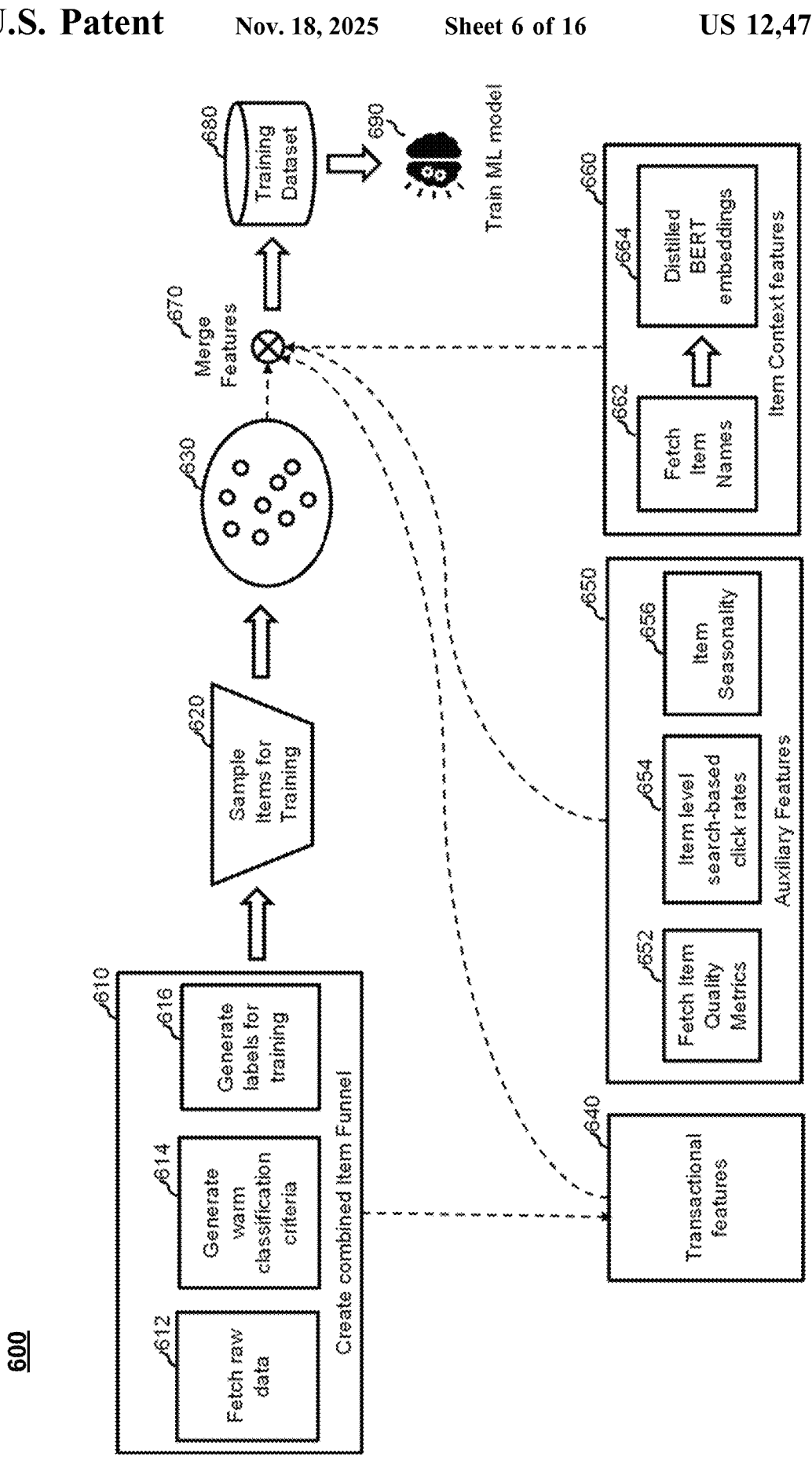
FIG. 6 illustrates a process for automatically training a machine learning model for warm-up prediction, in accordance with some embodiments.

FIG. 6 illustrates a process 600 for automatically training a machine learning model for warm-up prediction, in accordance with some embodiments of the present teaching. In some embodiments, the process 600 may be carried out by one or more computing devices, such as the advertising campaign computing device 102 and/or the cloud-based engine 121 of FIG. 1. As shown in FIG. 6, the process 600 starts from operations 610, including operations 612, 614, 616. At operation 612, raw data are fetched for items, e.g. transactional data, impressions, reviews, volume, GMV of each item. At operation 614, a warm classification criterion is created based on the fetched data. At operation 616, labels are generated for training based on the classification criteria. After the operations 612~616, a combined item funnel is created based on the data, classification criteria and the labels.

At operation 620, items are sampled to generate data for sampled items 630 for training, because the catalogue of a retailer could be very big. In addition, the sampling can balance the event rate and help the monitoring. Various features of the sampled items 630 are merged at operation 670. The features can be collected at operations 640, 650, 660.

At operations 640, transactional features of the sampled items 630 are collected, or filtered out from all transactional features. At operations 650, various auxiliary features of the sampled items 630 are fetched and collected, including e.g. item quality metrics fetched at operation 652, item level search-based click rate data collected at operation 654, item seasonality indexes collected at operation 656. In some embodiments, the auxiliary features collected at the operations 650 also include but not limited to: item's customer rating, indicator if an item could be delivered within two or three days, item price, if the price is less or higher than a competitor's price, a quality score for the item, ratio of clicks with respect to impressions based on item search, indication of seasonality of an item category, etc.

At operations 660, item context features of the sampled items 630 are collected, including e.g. item names fetched at operation 662, distilled BERT embeddings generated and collected at operation 664. In some embodiments, each BERT embedding may be a 128-dimensional embedding generated based on context information (e.g. name, description, category, hierarchy, etc.) of a corresponding item.

After all of these features are merged at operation 670, a training dataset 680 is generated and used to train a machine learning model at operation 690. In some embodiments, the trained machine learning model can be used to predict whether an item will become warm in a coming time period, e.g. the coming month.

Figure 7:
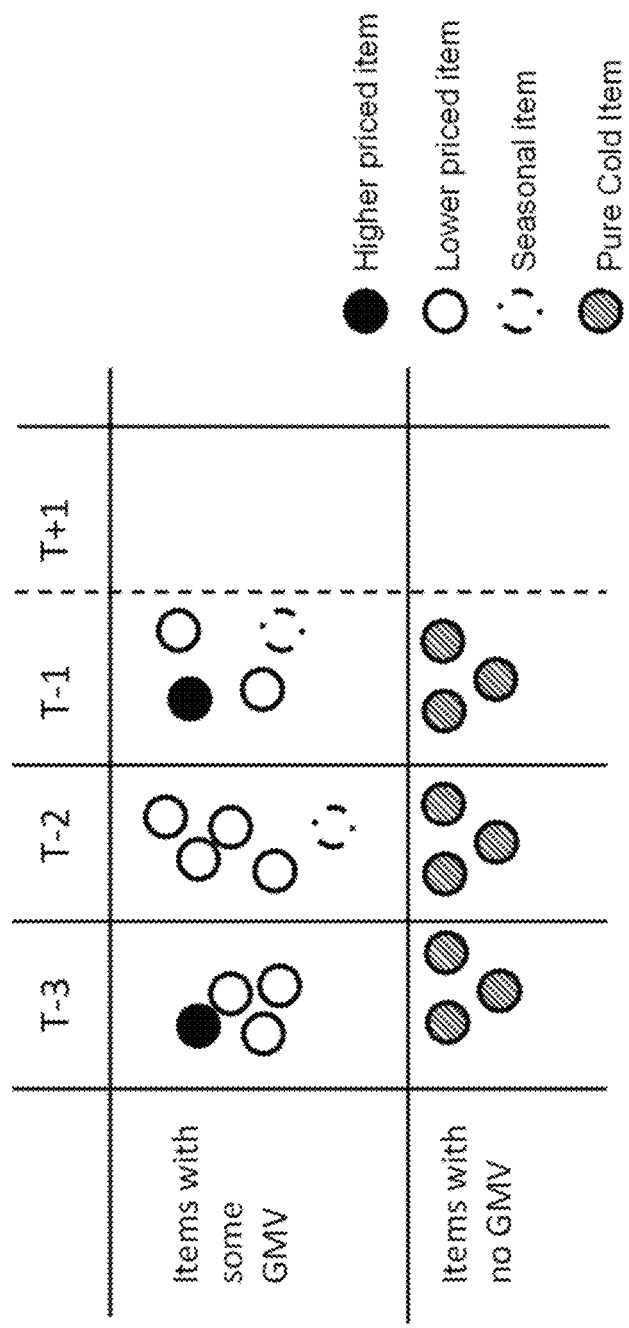
FIG. 7 shows an example of warm item classification, in accordance with some embodiments.

FIG. 7 shows an example of warm item classification, in accordance with some embodiments of the present teaching. As shown in FIG. 7, a four-month time window is considered in this example, while other time windows can be considered in a similar manner in other embodiments. The items having some GMV may include: items having a higher price, items having a lower price, and items that are seasonal towards one or more particular months. The classification is useful to predict whether an item will become or still be warm in the coming month.

In general, a higher priced item tends to have less volume than a lower priced item; and items with lower price often get sold more in volume. In addition, an item having a high volume or GMV in one month may be due to its seasonality to that month. As such, it is better to normalize an item's GMV or volume across multiple months, e.g. T−3 to T−1, to achieve an accurate GMV prediction for the coming month T+1. Some items do not have any GMV and are pure cold items. It is typical for a retailer to have a catalog including a substantially large portion of items being cold items in a given month.

Figure 8:
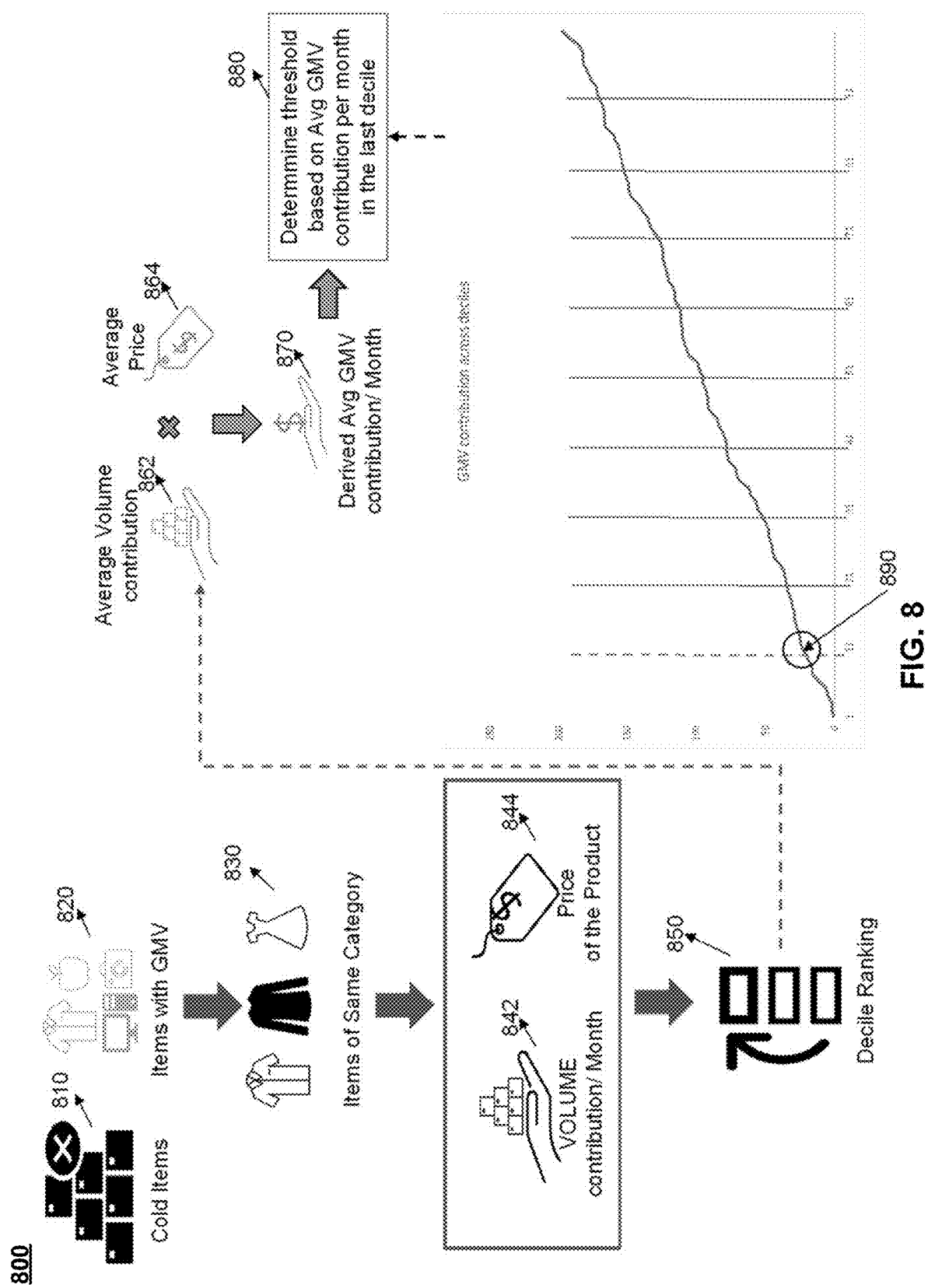
FIG. 8 illustrates a process for determining a threshold for warm transition, in accordance with some embodiments.

While warm and cold items can follow various definitions, one example is to compute a threshold to define whether an item has become warm or not. FIG. 8 illustrates a process 800 for determining a threshold for warm transition, in accordance with some embodiments of the present teaching. While cold items 810 do not have much volume or GMV data to analyze, the system can consider items 820 which have some GMV data during last several months. At operation 830, items falling into one same category are selected from the items 820.

At operation 842, the volume contribution per month of each selected item is computed, e.g. based on dividing a sum of the item's volume for the last three months by three. This is for normalization to have a fair comparison across all items. At operation 844, the price of each selected item is determined, e.g. based on all price values of the item for the last three months.

At operation 850, the items in a same category are ranked based on a composite key of volume per month and price, and divided into multiple deciles or buckets such that each bucket has a same count of items. The same category is to ensure a fair comparison of GMV and price of the items, because items within the same category would have similar or comparable behavior in terms of sales and price.

For each decile, an average volume contribution per month is computed at operation 862 for that decile, and an average price is computed at operation 864 for that decile. An average GMV contribution per month is then computed at operation 870 for every decile, e.g. based on a multiplication of the average volume contribution per month and the average price. Based on a distribution of the average GMV contribution per month for all deciles, the system can determine at operation 880 a threshold 890 based on the average GMV contribution per month in the last decile, which has the lowest average GMV contribution per month among the ten deciles.

As such, any item having a GMV contribution per month more than the threshold can be called a warm item; and any item having a GMV contribution per month less than the threshold can be called a cold item. In some embodiments, this threshold can also be used to generate labels for training the machine learning model in FIG. 6.

Figure 9:
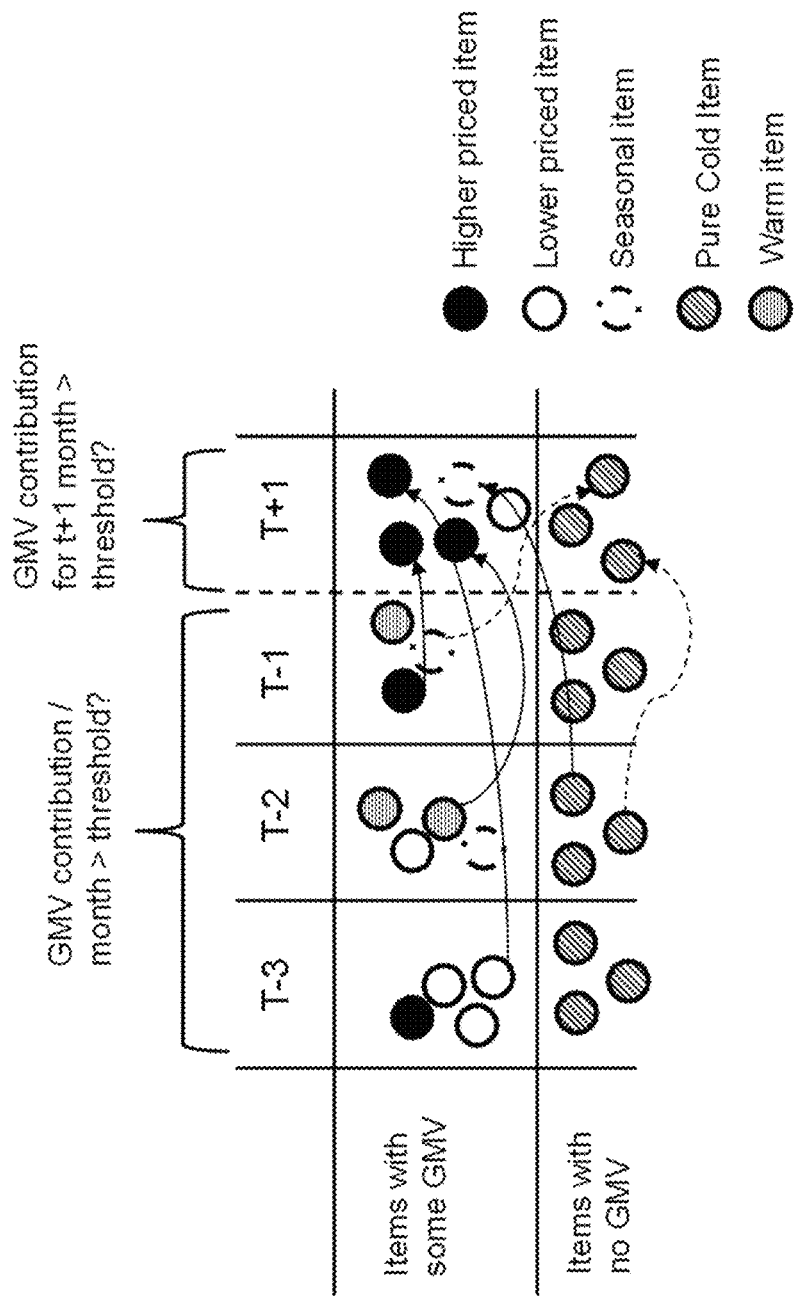
FIG. 9 illustrates an example of item state transitions, in accordance with some embodiments.

FIG. 9 illustrates an example of item state transitions, in accordance with some embodiments of the present teaching. The items with no GMV are pure cold items; but the items with some GMV are not all warm items. The threshold computed in FIG. 8 may be used to identify items which have been warm or cold in the T−3 to T−1 time window frame. For example, for each item, the system can determine whether its GMV contribution per month averaged over the three months is larger than the threshold. If so, the item is determined to be warm in the last three months. Otherwise, the item is determined to be cold in the three months.

During a training stage, the system uses items having data from all of the four months, i.e. T−3 to T+1 months. The same threshold computed in FIG. 8 can be used to generate labels for training. For example, the system can compute GMV contribution in the T+1 month for each item, and determine whether the GMV contribution is larger than the threshold. If so, the system can label the item as a warm item in T+1 month. Otherwise, the system can label the item as a cold item in T+1 month. These labels can act as a ground truth at an item level for training. In some embodiments, the labels are generated at decile level or category level, but still used as a ground truth at an item level for training. For example, the system can train the machine learning model as shown in FIG. 6, to ensure that the trained machine learning model can predict the correct label (cold or warm) for each item in the T+1 month, based on the data from the T−3 to T−1 months and/or the various features discussed referring to FIG. 6.

During an inference or prediction stage, there are four possible state transitions for each item from the last three months to the next month: cold to warm, cold to cold, warm to warm, warm to cold. For advertisement bidding for cold items, the system is most interested in the transition into warm from the state of cold. That is, among the cold items identified based on data of a past time period (e.g. past several months), the trained machine learning model can be used to select a subset of cold items that are predicted to become warm in a future time period (e.g. the coming month).

Figure 10:
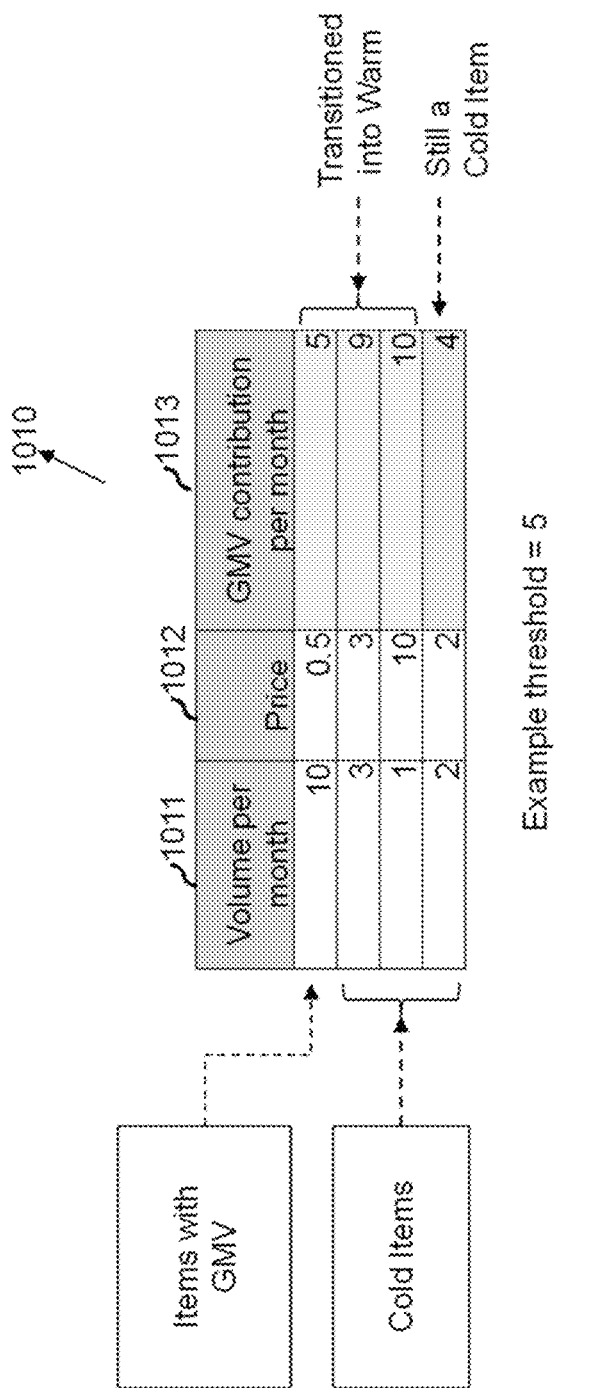
FIG. 10 illustrates an example of generating labels for training, in accordance with some embodiments.

FIG. 10 illustrates an example of generating labels for training, in accordance with some embodiments of the present teaching. As shown in FIG. 10, a table 1010 includes three columns: a volume per month column 1011, a price column 1012, a GMV contribution per month 1013. The GMV contribution per month is computed by multiplying the volume per month with the corresponding price. These are data for T+1 month for different items. The first row represents an item with GMV for last several month; while the other three rows represent cold items with no or little GMV in the last several months. When the example threshold is equal to 5 (e.g. based on average GMV contribution per month in the lowest decile), the system can compare the GMV contribution per month for each item with the threshold 5. Based on the comparisons, the first three items in the first three rows are transitioned into warm state; while the last item in the last row is still a cold item. These labels of warm or cold states can be used for training the machine learning model as discussed above.

Figure 11:
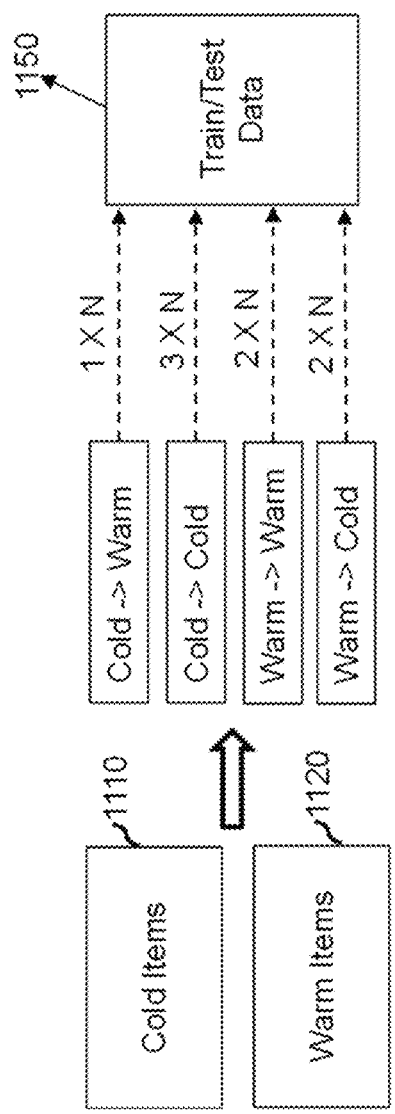
FIG. 11 illustrates an example of sampling items for training, in accordance with some embodiments.

FIG. 11 illustrates an example of sampling items for training, in accordance with some embodiments of the present teaching. Since substantial items are cold in the catalog, the event rate of cold to warm is very low. To balance this, the system can pick items as per the distribution shown in FIG. 11.

As shown in FIG. 11, for each of the cold items 1110, it can become warm or stay cold. In this example, N samples are generated from items having cold to warm transitions and 3*N samples are generated from items having cold to cold transitions. In addition, for each of the warm items 1120, it can stay warm or become cold. In this example, 2*N samples are generated from items having warm to warm transitions and 2*N samples are generated from items having warm to cold transitions. That is, for every sample generated for cold to warm transition, three samples are generated for cold to cold transition, two samples are generated for warm to warm transition; and two samples are generated for warm to cold transition. All of the samples are used to generate the training and test data 1150.

In some embodiments, the item samples in the four kinds of transitions are picked up randomly. In some embodiments, the sampling is performed at category level, where the items are grouped together into categories, e.g. phones, books, etc.

Figure 12:
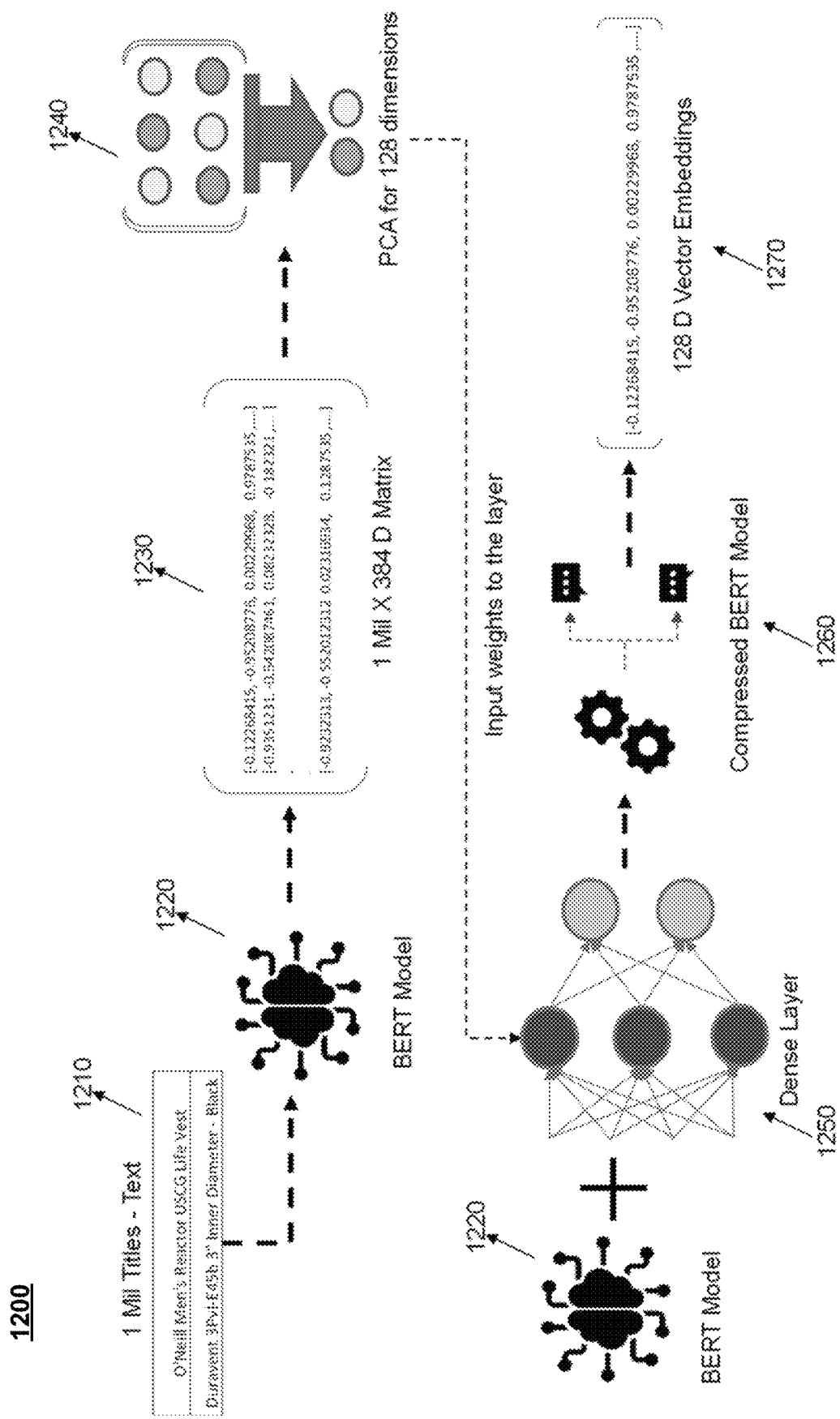
FIG. 12 illustrates an example of generating embeddings for training, in accordance with some embodiments.

FIG. 12 illustrates an example of a process 1200 to generate context embeddings of items for training, e.g. the BERT embeddings 664 in FIG. 6, in accordance with some embodiments of the present teaching. In this example, given each item name or product title 1210 of a cold item, a BERT model 1220 is used to generate a 384-dimensional matrix 1230 to represent context of the cold item name.

Then a principal component analysis (PCA) is performed to generate a 128-dimensional matrix 1240 based on the 384-dimensional matrix 1230. The 128-dimensional matrix 1240 is used to initialize the weights for the dense layers of a neural network 1250, which can be added on top of the BERT model 1220, to generate a compressed BERT model 1260. The compressed BERT model 1260 can generate output a 128-dimensional vector embedding 1270 for each cold item. In some embodiments, the 128-dimensional vector embedding 1270 can be used for training the machine learning model in FIG. 6.

Figure 13:
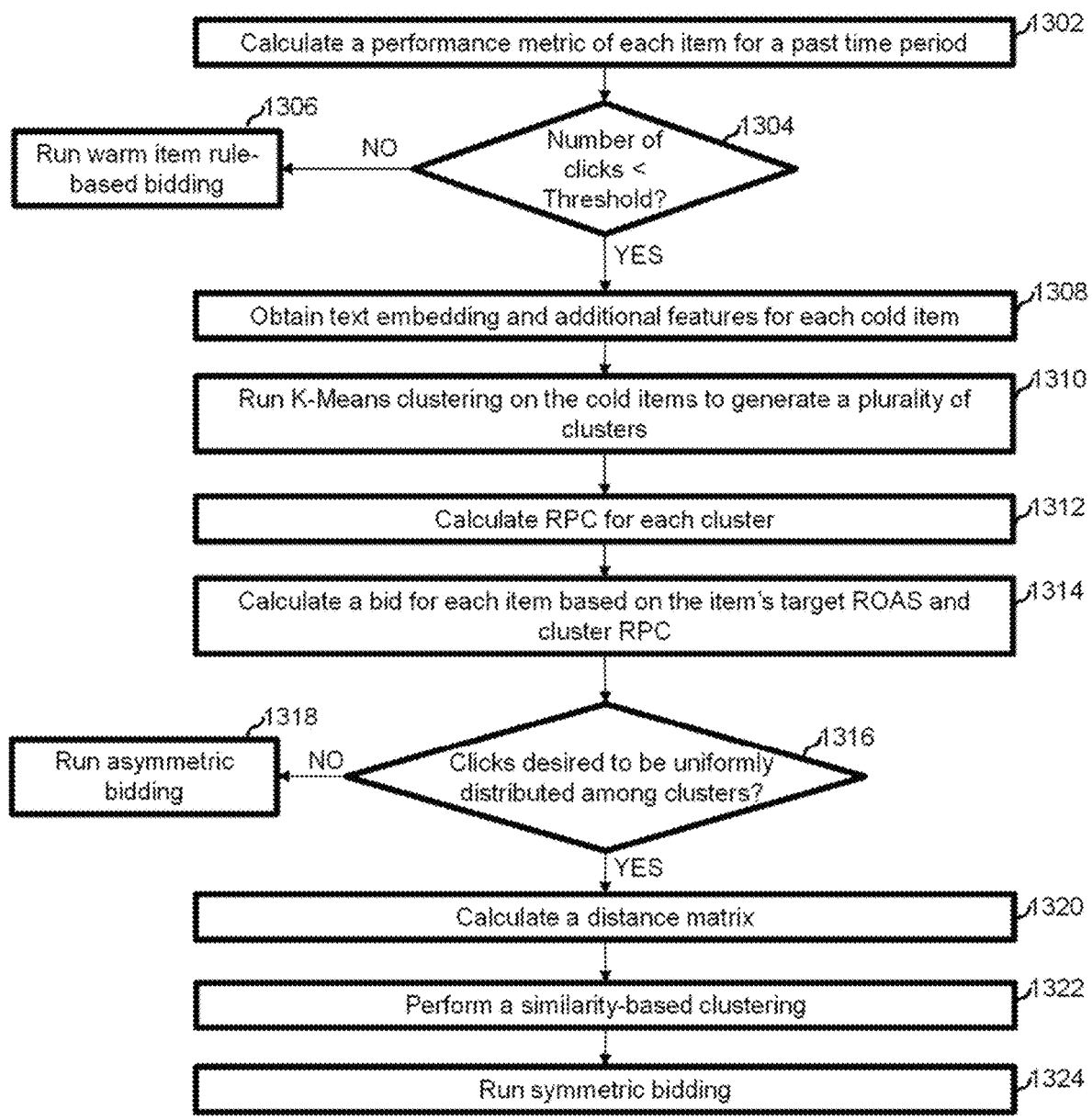
FIG. 13 is a flowchart illustrating an exemplary method for automatically bidding for cold items, in accordance with some embodiments.

FIG. 13 is a flowchart illustrating an exemplary method 1300 for automatically bidding for cold items, in accordance with some embodiments of the present teaching. In some embodiments, the method 1300 can be carried out by one or more computing devices, such as the advertising campaign computing device 102 and/or the cloud-based engine 121 of FIG. 1. Beginning at operation 1302, a performance metric is calculated for each item for a past time period, e.g. last 60 days. At operation 1304, it is determined whether the number of clicks for each item since the last update of its bid value, is less than a threshold, e.g. 100. If not, the process goes to operation 1306, where a warm item rule-based bidding is performed as the item has become warm. Otherwise, if the number of clicks for an item since its last bid update is indeed less than a threshold, the item stays cold. The process then goes to operation 1308.

At operation 1308, text embeddings, item category hierarchy features, and additional features as discussed above regarding FIGS. 6-12 are obtained for each cold item. At operation 1310, a K-Means clustering is performed on the cold items to generate a plurality of cluster. At operation 1312, RPC is calculated for each cluster. At operation 1314, a bid value is calculated for each item based on the item's target RPC and cluster-level RPC. In some embodiments, each item also has the same RPC as its cluster.

At operation 1316, it is determined whether clicks are desired to be uniformly distributed among the clusters. If so, the process moves on to operations 1320~1324 to run a symmetric bidding. If not, the process goes to operation 1318 to run an asymmetric bidding.

The clusters generated at the operation 1310 may or may not be balanced in terms of traffic. Without any control or constraint, the generated clusters are seldomly balanced. But at the operation 1316, it may be determined that the generated clusters are not desired to improve their traffic balance. This may be due to various reasons, e.g. the generated clusters are already balanced enough, the clicks are already more or less uniformly distributed among the clusters, or the system needs to save time to generate an updated bid value quickly. In these cases, the process goes to operation 1318 to determine and transmit the updated bid value generated at the operation 1314 for each cold item, to the SEM platform for advertisement bidding.

If at the operation 1316, it is determined that the generated clusters are not balanced in traffic, and are desired to improve their traffic balance, the process goes to operations 1320~1324. This may be due to various reasons, e.g. the generated clusters are not balanced enough, the clicks are not uniformly distributed among the clusters, the system has enough time to generate a more reliable updated bid value for each item, or based on a default setting of the system.

At operation 1320, a distance matrix is calculated for all the clusters, to represent the distances between clusters. A similarity-based clustering algorithm, which is a heuristic algorithm, is performed at operation 1322 to move some items from one cluster to another to ensure all the clusters have the uniformly distributed clicks. For example, if one cluster is overloaded with the number of the clicks, then the system can pass some of the items in that cluster to another cluster that is close in terms of distance, based on the distance matrix. At operation 1324, a symmetric bidding is performed based on the re-balanced clusters, by e.g. computing cluster-level RPC, and computing an updated bid value for each item based on the item's target ROAS and cluster-level RPC of one re-balanced cluster to which the item belongs. Similarly, the updated bid value for each cold item can be transmitted to the SEM platform for advertisement bidding.

Figure 14:
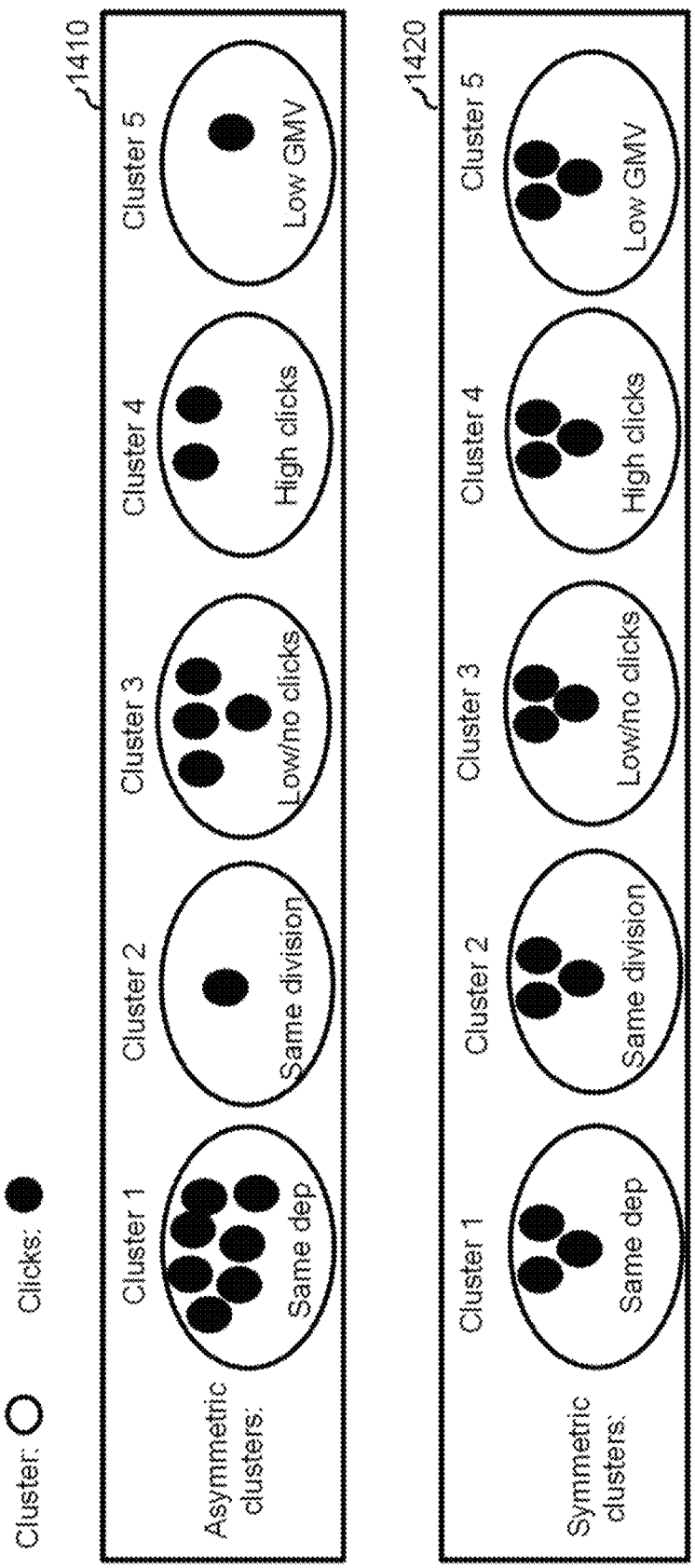
FIG. 14 illustrates examples of asymmetric clustering and symmetric clustering, in accordance with some embodiments.

FIG. 14 illustrates examples of asymmetric clustering and symmetric clustering, in accordance with some embodiments of the present teaching. In the examples shown in FIG. 14, both asymmetric clustering and symmetric clustering result in five clusters: Clusters 1~5. Cluster 1 includes items in a same department. Cluster 2 includes items in same division. Cluster 3 includes items with low or no clicks. Cluster 4 includes items with high clicks. Cluster 5 includes items with low GMV. Each item is assigned to only one of the five clusters, based on its most important feature related to a corresponding one of the five clusters. For example, if one item has two features: (a) having high clicks and (b) being related to a given same department (e.g. phone department), then the system can determine which one of the two features is more powerful, or more outstanding compared to other items. The item is then assigned to a corresponding cluster based on its most powerful and outstanding feature.

For asymmetric clustering 1410, the generated five asymmetric clusters include different numbers of clicks. The number of clicks for one cluster is computed based on a summation of clicks of all items in that cluster, given a time period. Each black dot in a cluster in FIG. 14 represents a same fixed number of clicks, e.g. 1000 clicks. As shown in FIG. 14, in asymmetric clustering 1410, asymmetric Cluster 1 has clicks that are multiple times of the clicks of asymmetric Clusters 2, 4 and 5. So the distribution of clicks is very un-balanced among the asymmetric clusters. In this case, the final predicted RPC values for each cluster can be noisy and biased (in favor of one cluster over another).

The symmetric clustering 1420 aims to solve the drawbacks of asymmetric clustering, by moving some of these items from one over-loaded cluster (in terms of clicks rather than items) to a neighboring cluster, to ensure a uniform distribution of the clicks or traffic among the clusters. In some embodiments, each cluster can be represented by its center in an embedding space. The system can calculate the distance between two centers of any two clusters. In some embodiments, the distance can be computed based on a square metric of cluster similarity. As such, for a given cluster that is click-overloaded, the system can rank the other clusters in terms of their distances to the given cluster, to determine the neighboring cluster for the given cluster.

In the examples shown in FIG. 14, it is assumed that there are 15,000 total clicks, to be distributed into 5 clusters. As such, a uniform distribution would make each of the 5 clusters include 3,000 clicks, which an average click threshold. In some embodiments, for symmetric clustering 1420, the system may first look at the asymmetric Cluster 1, and determine that it is over-loaded compared to the average click threshold. As such, the system can find the closest cluster to asymmetric Cluster 1, e.g. asymmetric Cluster 4, based on distance or cluster similarity. Because Clusters 1 and 4 are closest to each other, the items in the two clusters may share some behaviors. For example, the items in asymmetric Cluster 1 can be ranked to identify items with the feature of asymmetric Cluster: highest number of clicks. As such, one or more top ranked items in terms of number of clicks in asymmetric Cluster 1 can be moved to asymmetric Cluster 4. Similar operations can be performed iteratively for other asymmetric clusters, until all clusters have about even number of clicks, e.g. until the variance of number of clicks of the clusters is below a predetermined threshold.

The symmetric clustering 1420 would lose some initial accuracy of clustering, but could achieve a more balanced and symmetric distribution of clicks among the clusters, compared to the asymmetric clustering 1410. As such, after the symmetric clustering 1420, each cluster is trustworthy with aggregated traffic. In contrast, for asymmetric clustering 1410, at least asymmetric Clusters 2 and 5 are not very reliable because their clicks are very low, without using the power of aggregation.

Figure 15:
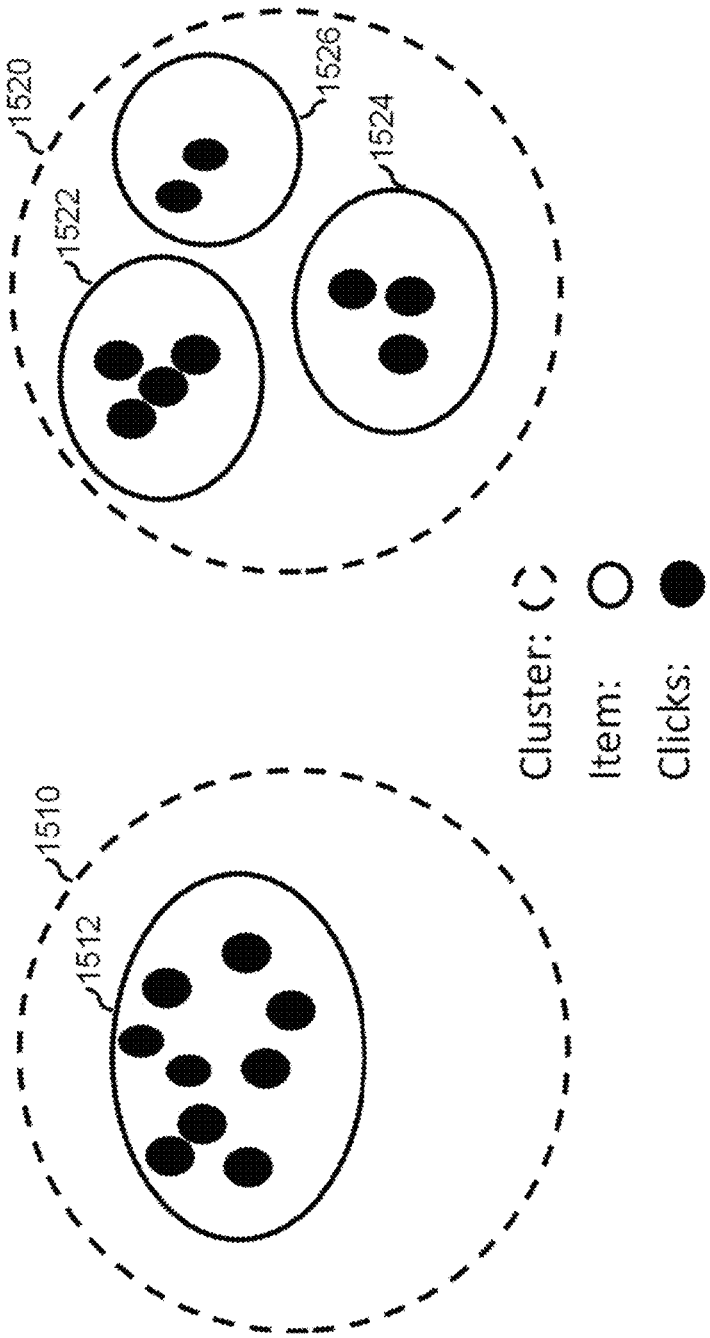
FIG. 15 illustrates an example of symmetric clustering and bidding, in accordance with some embodiments.

The symmetric clustering 1420 generate clusters having equal number of clicks, but not necessarily equal number of items. FIG. 15 illustrates an example of symmetric clustering and bidding, in accordance with some embodiments of the present teaching. As shown in FIG. 15, the cluster 1510 has one item 1512, while the cluster 1520 has three items 1522, 1524, 1526. But the two clusters have the same total number of clicks. That is, two symmetric clusters can have different numbers of items, but maintain equal number of clicks.

Figure 16:
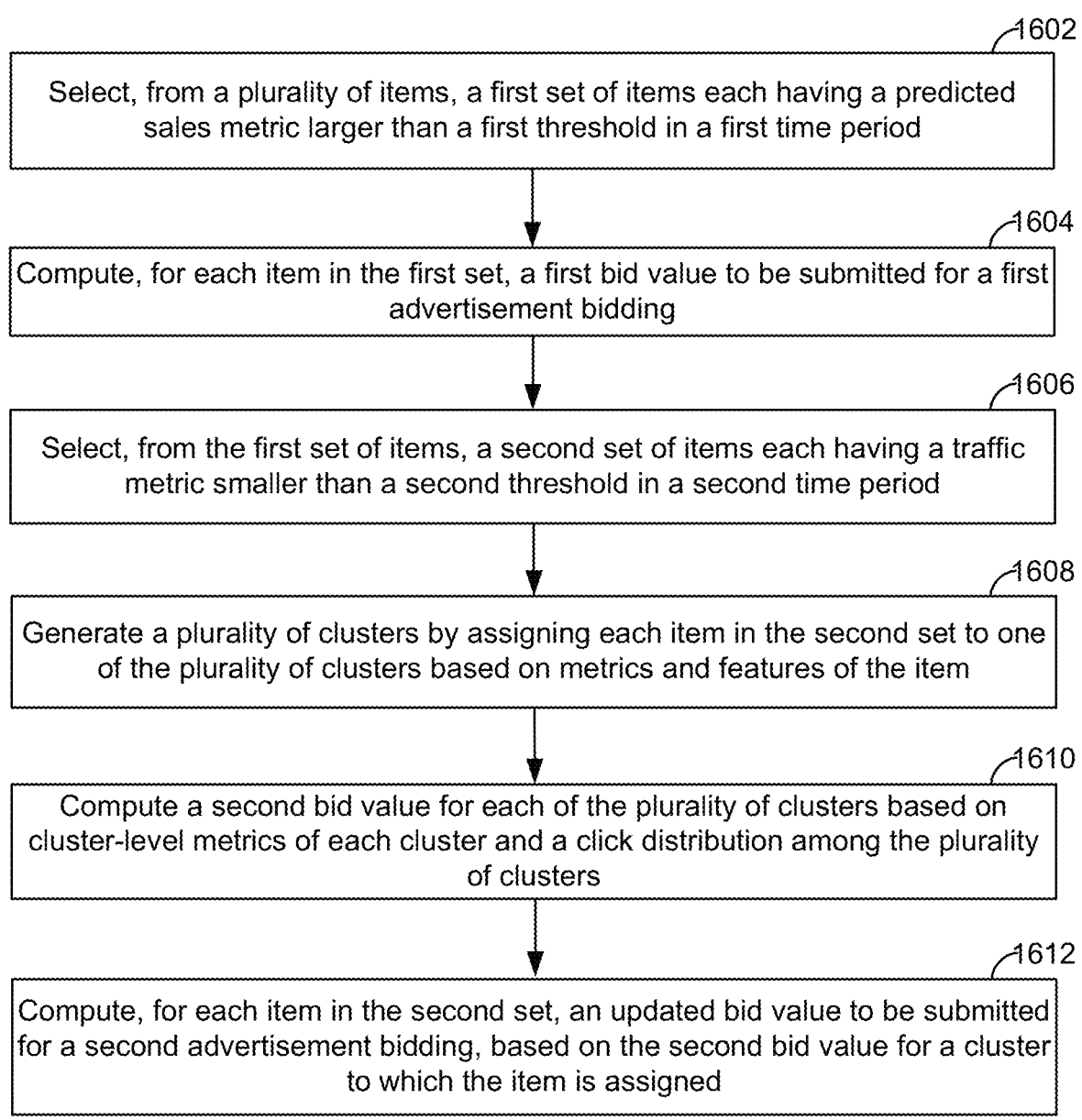
FIG. 16 is a flowchart illustrating an exemplary method for automatically computing and updating advertisement biddings for cold items, in accordance with some embodiments.

FIG. 16 is a flowchart illustrating an exemplary method 1600 for automatically computing and updating advertisement biddings for cold items, in accordance with some embodiments of the present teaching. In some embodiments, the method 1600 can be carried out by one or more computing devices, such as the advertising campaign computing device 102 and/or the cloud-based engine 121 of FIG. 1. Beginning at operation 1602, a first set of items is selected from a plurality of items, where each item in the first set has a predicted sales metric larger than a first threshold in a first time period. At operation 1604, a first bid value is computed, for each item in the first set, to be submitted for a first advertisement bidding. From the first set of items, a second set of items are selected at operation 1606, where each item in the second set has a traffic metric smaller than a second threshold in a second time period. Each item in the second set is assigned at operation 1608 to one of a plurality of clusters based on metrics and features of the item. A second bid value is then computed at operation 1610 for each of the plurality of clusters based on cluster-level metrics of each cluster and a click distribution among the plurality of clusters. An updated bid value is computed at operation 1612, for each item in the second set, to be submitted for a second advertisement bidding, based on the second bid value for a cluster to which the item is assigned.

Although the methods described above are with reference to the illustrated flowcharts, it will be appreciated that many other ways of performing the acts associated with the methods can be used. For example, the order of some operations may be changed, and some of the operations described may be optional.

The disclosed system and method can automatically identify filter combinations or sections of data where the user needs to focus on, and provide interpretable and actionable insights from tabular data using natural language generation models. The system can generate critical insights by holistically looking at multiple dimensions (e.g. anomaly, trend and correlation) of various features. The system may utilize a self-learning framework that adapts based on users' feedback to provide more meaningful insights. As such, the system can guide end users instantly to the most critical sections of data and provide interpretable insights, which otherwise would have taken considerable time and effort. This avoids a long learning curve associated with getting familiarized to a new dashboard and identifying critical elements for new users, and provides a starting point to accelerate the workflow for experienced users by providing them with more investigation time. In some embodiments, users can save on an average about three hours while looking for critical insights from a dashboard, after using the disclosed method. In some embodiments, the disclosed system can be integrated into an AI system that can automatically convert any table, chart or dashboard data, into actionable and interpretable insight cards.

The disclosed system and method can be applied to any dashboard on any dataset, e.g. datasets related to chatbot analytics, fraud prevention, loss prevention, waste, advertisements, etc. Before applying the disclosed method to a new dataset, one or more models may be re-trained. For example, reference sentences used to train or tune a natural language generation model may vary depending on the use case. Reference sentences for a waste dashboard can be very different from reference sentences for a fraud prevention dashboard. In addition, features used to detect an insight dimension might be different for different use cases. For example, features like customer refund average and cancellation rate can be used train an isolation forest model and detect an anomaly from a transaction fraud prevention dataset. But other features like waste due to discount and waste due to expiration can be used to train an isolation forest model and detect an anomaly from a waste dataset.

In some embodiments, the disclosed system and method can be applied to a data product, like Walmart Luminate, to give merchants and suppliers access to rich and aggregated customer insights that can enable their smarter and faster decision-making. By re-training one or more models, the disclosed system and method can automatically generate insight data in the form of natural language. The insight data may be related to shopper behavior, customer perception, and/or channel performance, to help merchants and suppliers to easily understand the customers' needs and wants. Different suitable sets of reference sentences may be automatically generated to train or tune a natural language generation model for insights related to shopper behavior, customer perception, and channel performance, respectively. Different features may be identified for training an anomaly detection model and detecting an anomaly from datasets related to shopper behavior, customer perception, and channel performance, respectively. Based on the disclosed system and method, a user can efficiently and effectively leverage a service like Walmart Luminate to obtain insights for category reviews, category planning, category assessment, assortment optimization, trade activity optimization, trade planning, multiple brand optimization, white space planning, marketing planning, category and channel strategy, portfolio optimization, etc.

In some embodiments, the disclosed system and method can be applied to an advertising platform, like Walmart Connect, to help brand advertisers and sellers meaningfully connect with customers on their shopping journey, online or in-store, to find the right product or discover a new one. By re-training one or more models, the disclosed system and method can automatically generate insight data in form of natural language. The insight data may be related to search advertisements, display advertisements, in-store advertisements, brand interactions, and advertisement impact measurements, to help marketers to create more refined, relevant and measurable advertising campaigns, which can be adapted on-the-fly to changing circumstances and real-time performance. Different suitable sets of reference sentences may be automatically generated to train or tune a natural language generation model for insights related to search advertisements, display advertisements, in-store advertisements, brand interactions, and advertisement impact measurements, respectively. Different features may be identified for training an anomaly detection model and detecting an anomaly from datasets related to search advertisements, display advertisements, in-store advertisements, brand interactions, and advertisement impact measurements, respectively. Based on the disclosed system and method, seller and advertisers can efficiently and effectively leverage a service like Walmart Connect to accelerate their connections to customers in a closed-loop, omnichannel environment.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a non-transitory memory having instructions stored thereon; and
   at least one processor operatively coupled to the non-transitory memory, and configured to read the instructions to:
   receive, from a database, user transaction data and attribute data for a plurality of items in a first time period;
   execute a trained prediction model to operate on the user transaction data and the attribute data and generate a predicted sales metric for each of the plurality of items;
   select, from the plurality of items, a first set of items each having the predicted sales metric larger than a first threshold in the first time period;

execute, for each item in the first set, a first bidding model to generate a first bid value to be submitted for a first advertisement bidding;

select, from the first set of items, a second set of items each having a traffic metric smaller than a second threshold in a second time period;

execute a trained clustering model to operate on metrics and features of each of the second set of items and generate a plurality of clusters by assigning each item in the second set to one of the plurality of clusters;

execute a second bidding model to operate on cluster-level metrics of each cluster and a click distribution among the plurality of clusters and generate a second bid value for each of the plurality of clusters;

execute, for each item in the second set, the second bidding model to operate on the second bid value for a cluster to which the item is assigned and generate an updated bid value to be submitted for a second advertisement bidding; and store the updated bud value for each item in the second set in a database.

2. The system of claim 1, wherein the trained clustering model is an asymmetrical clustering model.

3. The system of claim 1, wherein the trained clustering model is a k-means clustering model.

4. The system of claim 1, wherein the second bidding model generates the second bid value at least based on Bidirectional Encoder Representations from Transformers (BERT) embeddings.

5. The system of claim 4, wherein the BERT embeddings are provided to a trained model, and wherein the trained model is generated based on a training data structure constructed by emulating a process of transitioning from a cold state to a warm state.

6. The system of claim 5, wherein the training data structure includes a plurality of points, and wherein each point is labeled with a corresponding conversion rate.

7. A computer-implemented method, comprising:

receiving, from a database, user transaction data and attribute data for a plurality of items in a first time period;

executing a trained prediction model to operate on the user transaction data and the attribute data and generating a predicted sales metric for each of the plurality of items;

selecting, from the plurality of items, a first set of items each having the predicted sales metric larger than a first threshold in the first time period;

executing, for each item in the first set, a first bidding model to generate a first bid value to be submitted for a first advertisement bidding;

selecting, from the first set of items, a second set of items each having a traffic metric smaller than a second threshold in a second time period;

executing a trained clustering model to operate on metrics and features of each of the second set of items and generating a plurality of clusters by assigning each item in the second set to one of the plurality of clusters;

executing a second bidding model to operate on cluster-level metrics of each cluster and a click distribution among the plurality of clusters and generating a second bid value for each of the plurality of clusters; and executing, for each item in the second set, the second bidding model to operate on the second bid value for a cluster to which the item is assigned and generating an updated bid value to be submitted for a second advertisement bidding; and storing the updated bid value for each item in the second set in a database.

8. The computer-implemented method of claim 7, wherein the trained clustering model is an asymmetrical clustering model.

9. The computer-implemented method of claim 7, wherein the trained clustering model is a k-means clustering model.

10. The computer-implemented method of claim 7, wherein the second bidding model generates the second bid value at least based on Bidirectional Encoder Representations from Transformers (BERT) embeddings.

11. The computer-implemented method of claim 10, wherein the BERT embeddings are provided to a trained model, and wherein the trained model is generated based on a training data structure constructed by emulating a process of transitioning from a cold state to a warm state.

12. The computer-implemented method of claim 11, wherein the training data structure includes a plurality of points, and wherein each point is labeled with a corresponding conversion rate.

13. A non-transitory computer readable medium having instructions stored thereon, wherein the instructions, when executed by at least one processor, cause at least one device to perform operations comprising:

receiving, from a database, user transaction data and attribute data for a plurality of items in a first time period;

executing a trained prediction model to operate on the user transaction data and the attribute data and generating a predicted sales metric for each of the plurality of items;

selecting, from the plurality of items, a first set of items each having the predicted sales metric larger than a first threshold in the first time period;

executing, for each item in the first set, a first bidding model to generate a first bid value to be submitted for a first advertisement bidding;

selecting, from the first set of items, a second set of items each having a traffic metric smaller than a second threshold in a second time period;

executing a trained clustering model to operate on metrics and features of each of the second set of items and generating a plurality of clusters by assigning each item in the second set to one of the plurality of clusters;

executing a second bidding model to operate on cluster-level metrics of each cluster and a click distribution among the plurality of clusters and generating a second bid value for each of the plurality of clusters; and executing, for each item in the second set, the second bidding model to operate on the second bid value for a cluster to which the item is assigned and generating an updated bid value to be submitted for a second advertisement bidding; and storing the updated bid value for each item in the second set in a database.

14. The non-transitory computer readable medium of claim 13, wherein the trained clustering model is an asymmetrical clustering model.

15. The non-transitory computer readable medium of claim 13, wherein the trained clustering model is a k-means clustering model.

16. The non-transitory computer readable medium of claim 13, wherein the second bid value is determined at least based on Bidirectional Encoder Representations from Transformers (BERT) embeddings.

17. The non-transitory computer readable medium of claim 16, wherein the BERT embeddings are provided to a trained model, and wherein the trained model is generated based on a training data structure constructed by emulating a process of transitioning from a cold state to a warm state, and wherein the training data structure includes a plurality of points, and wherein each point is labeled with a corresponding conversion rate.

18. The system of claim 1, wherein the at least one processor comprises a first processor and a plurality of processing units of a plurality of virtual machines, wherein the first processor is configured to read the instructions to assign each of the trained prediction model, the first bidding model, the trained clustering model, and the second bidding model to at least one of the plurality of virtual machines for execution.

19. The system of claim 1, wherein the at least one processor is configured to read the instructions to:
  receive, over a network, a bid request from a remote device; and
  transmit, over the network, the updated bid value for each item in the second set to the remote device.

20. The computer-implemented method of claim 7, comprising assigning each of the trained prediction model, the first bidding model, the trained clustering model, and the second bidding model to at least one of a plurality of virtual machines for execution.

* * * * *